(12) United States Patent
Morchon et al.

(10) Patent No.: US 11,917,063 B2
(45) Date of Patent: Feb. 27, 2024

(54) PUBLIC/PRIVATE KEY SYSTEM WITH INCREASED SECURITY

(71) Applicant: KONINKLIJKE PHILIPS N.V., Eindhoven (NL)

(72) Inventors: Oscar Garcia Morchon, Eindhoven (NL); Paulus Mathias Hubertus Mechtildis Antonius Gorissen, Pelt (BE); Ludovicus Marinus Gerardus Maria Tolhuizen, Waalre (NL)

(73) Assignee: Koninklijke Philips N.V., Eindhoven (NL)

( * ) Notice: Subject to any disclaimer, the term of this patent is extended or adjusted under 35 U.S.C. 154(b) by 0 days.

(21) Appl. No.: 17/786,573

(22) PCT Filed: Dec. 24, 2020

(86) PCT No.: PCT/EP2020/087868
§ 371 (c)(1),
(2) Date: Jun. 17, 2022

(87) PCT Pub. No.: WO2021/130366
PCT Pub. Date: Jul. 1, 2021

(65) Prior Publication Data
US 2023/0052293 A1    Feb. 16, 2023

(30) Foreign Application Priority Data

Dec. 24, 2019 (EP) .................................. 19219637
Mar. 31, 2020 (EP) .................................. 20167254

(51) Int. Cl.
*G06F 21/00*    (2013.01)
*H04L 9/30*    (2006.01)
(Continued)

(52) U.S. Cl.
CPC .......... *H04L 9/3093* (2013.01); *H04L 9/0841* (2013.01); *H04L 9/14* (2013.01)

(58) Field of Classification Search
CPC ........ H04L 9/3093; H04L 9/0841; H04L 9/14
See application file for complete search history.

(56) References Cited

U.S. PATENT DOCUMENTS 8,667,267 B1 * 3/2014 Garcia .................. H04L 63/061
                                                                713/168
9,319,223 B2 * 4/2016 Nix ......................... H04L 9/006
(Continued)

FOREIGN PATENT DOCUMENTS

| EP | 3402118 A1 | 11/2018 | |
|---|---|---|---|
| WO | 2019076706 A1 | 4/2019 | |
| WO | WO-2021130366 A1 * | 7/2021 | ........... H04L 9/0841 |

OTHER PUBLICATIONS

FrodoKEM Learning with Errors Key Encapsulation; Algorithm Specifications and Supporting Documentation, Nov. 30, 2017 https://csrc.nist.gov/projects/post-quantum-cryptography/round-2-submissions.
Alkim et al "New Hope Algorithm Specifications and Supporting Documentation" Nov. 30, 2017 https://csrc.nist.gov/projects/post-quantum-cryptography/round-2-submissions.
(Continued)

*Primary Examiner* — Kendall Dolly

(57) ABSTRACT

Some embodiments are directed to a second cryptographic device (20) and a first cryptographic device (10). The first and second cryptographic devices may be configured to transfer a key seed. The key seed may be protected using a public key from one party and a private key from the other party. For example, a public key may be obtained from a private key through a noisy multiplication. At least one of the first and second cryptographic device may validate an obtained public key, e.g., to avoid leakage of the key seed or of a private key.

28 Claims, 8 Drawing Sheets

(51) Int. Cl.
*H04L 9/08* (2006.01)
*H04L 9/14* (2006.01)

(56) References Cited

U.S. PATENT DOCUMENTS

| | | | | |
|---|---|---|---|---|
| 10,404,458 | B1* | 9/2019 | Yamada | ................ H04L 9/0852 |
| 10,454,681 | B1* | 10/2019 | Yamada | .............. H04L 63/0428 |
| 2014/0032909 | A1* | 1/2014 | Steele | ..................... H04L 9/321 |
| | | | | 713/150 |
| 2019/0312728 | A1 | 10/2019 | Poeppelmann | |
| 2021/0266164 | A1* | 8/2021 | Garcia-Morchon | ......................... |
| | | | | H04L 9/0841 |
| 2021/0294628 | A1* | 9/2021 | Tsirkin | ................ G06F 9/45558 |

OTHER PUBLICATIONS

D'Anvers et al SABER: Mod-LWR based KEM Sep. 23, 2017 https://csrc.nist.gov/projects/post-quantum-cryptography/round-2-submissions.

International Search Report and Written Opinion from PCT/EP2020/087868 dated Mar. 15, 2021.

Baan et al "Round 5: KEM and PKE Based on (Ring) Learning with Rounding" Mar. 28, 2019 ttps://csrc.nist.gov/projects/post-quantum-cryptography/round-2-submissions.

Avanzi et al "CRYSTALS-Kyber Algorithm Specifications and Supporting Documentation" Mar. 30, 2019 https://csrc.nist.gov/projects/post-quantum-cryptography/round-2-submissions.

* cited by examiner

PUBLIC/PRIVATE KEY SYSTEM WITH INCREASED SECURITY

CROSS-REFERENCE TO PRIOR APPLICATIONS

This application is the U.S. National Phase application under 35 U.S.C. § 371 of International Application No. PCT/EP2020/087868, filed on Dec. 24, 2020, which claims the benefit of EP Patent Application No. EP 20167254.0, filed on Mar. 31, 2020 and EP Patent Application No. EP 19219637.6, filed on Dec. 24, 2019. These applications are hereby incorporated by reference herein.

FIELD OF THE INVENTION

The invention relates to a second cryptographic device, a first cryptographic device, a public-key encryption method, a private-key decryption method and a computer readable medium.

BACKGROUND OF THE INVENTION

One way to address problems with key distribution is to use so-called asymmetric cryptography. In asymmetric cryptography, a key pair is used which comprises a public-key and a private-key. For this reason, asymmetric cryptography is also called public-key cryptography.

The public keys may be disseminated widely, but private keys are typically known only to few parties, e.g., only to its owner. The public key can be used to encrypt messages which can only be decrypted with the private key. In a public key encryption system, any person can encrypt a message using the receiver's public key. The encrypted message can only be decrypted with the receiver's private key. It is computationally impractical to find the private key from its corresponding public key. The public key and private key are referred to as a key pair.

Known public key encryption systems rely on cryptographic algorithms based on mathematical problems that currently admit no efficient solution. For example, the RSA public-key encryption system relies on the difficulty of integer factorization. Public key encryption based on elliptic curves relies on the difficulty of discrete logarithms.

Quantum computers pose a significant threat to modern cryptography. The two most widely adopted public key cryptosystems, namely, RSA and Elliptic Curve Cryptography (ECC), will be broken by general purpose quantum computers. Lattice based cryptography may be used as a quantum-computer resistant alternative. Many lattice based cryptography systems have been proposed.

For example, one such lattice based system is called Round5. Round5 is a submission in the second round of NIST's Post-Quantum Cryptography. A description of Round5 can be found on the NIST page: https://csrc.nistgov/projects/post-quantum-cryptography/round-2-submissions. The description document is titled "Round5: KEM and PKE based on (Ring) Learning with Rounding", dated Thursday Mar. 28, 2019. A description of Round5 can also be found on Cryptology ePrint archive: Report 2018/725, e.g., Version: 20190126:102712. These documents are included herein by reference. The former will be referred to as 'Round5'. Other lattice based cryptography documents are FrodoKEM, "Frodo-KEM: Learning With Errors Key Encapsulation", dated March 30,2019, NTRU, "NTRU", dated Mar. 30, 2019 SABER, "SABER: Mod-LWR based KEM (Round2 submission)", NewHope "New Hope", version 1.02, dated Mar. 15, 2019 and Crystals-Kyber "CRYSTALS-Kyber, (version 2.0), dated Mar. 30, 2019 description of which can be found as second round NIST candidates at the NIST page mentioned above. Descriptions of these are included herein from the NIST second round candidate proposals, as well.

For example, a second cryptographic device may be configured to use a public key of a first cryptographic device to derive a raw key. The raw key may be used to encapsulate a key seed, or pre-key, which in turn may be used to protect communication between the first and second cryptographic device. A lattice based system may be set up such that both devices can derive the same raw key, or at least raw keys that are so close that they can nevertheless be used to encapsulate and recover the same key seed.

SUMMARY OF THE INVENTION

The inventors found that these lattice based systems suffer from weak-key problems. For example, if a first public-key obtained at the second cryptographic device is weak, then the key-seed is not protected sufficiently for confidentiality. As a result, all communication that is protected using that key seed can be compromised. For example, the sensitive communication of the second cryptographic device, which was intended for the first cryptographic device may be read by an eavesdropper. For example, a first public key may be weak due to accident, e.g., programming error, transmission problems or by malice, e.g., in order to set up a plausible repudiation, or to create a problem for the second cryptographic device, etc.

Similar problems may happen at the side of the first cryptographic device. The first cryptographic device will use the second public-key of the second cryptographic device to recover the encapsulated key seed. A malicious choice of the second public-key may allow some information of the first cryptographic device's first private key to be leaked. This might not be noticed, since the second public key may be ephemeral, so many different second public key are expected. Accordingly, it may not be noticed that many second public keys are tried to leak parts of the first private key. For example, an attacker may notice whether the first cryptographic device was able to derive the shared key, or if the shared changed from a previous shared key.

These and other problems are addressed by embodiments described herein. A second cryptographic device is provided and a first cryptographic device. Using the second cryptographic device a key seed can be transferred to the first cryptographic device. The key seed may be used to encrypt a message. Having access to the public-key thus allows encryption of a message, but access to the private-key is required for decryption of said encrypted message.

For example, a second cryptographic device may obtain a first public key associated with the first cryptographic device, generate a second private-key, and compute a second public-key from the second private-key. For example, computing a public key from a private key may comprise noisy multiplying the private key with a shared object.

The first public key may be used to compute a second raw shared key, which in turn may be used to encapsulate a key seed. Because the first cryptographic device can obtain the same or nearly the same raw key it can decapsulate this data and so obtain the key seed. However, if the first public key is weak, the encapsulation does not sufficiently obscure the key seed, so that it is not suitable for later cryptographic use. For example, computing the raw key may comprise a noisy multiplication between the first public key and the second private key; if the first public key is small than so is the raw key.

For example, a first cryptographic device may receive from the second cryptographic device a second public-key and encapsulated data, compute a first raw shared key from the second public-key and the first private-key and use it to decapsulate the encapsulated data using at least part of the first raw shared key. A malicious second cryptographic device may send a specially crafted second public key instead of a real public key, e.g., one that has been obtained from a randomly generated second private key. The second device may do this in the hope that this will reveal information on the first private key. For example, an attacker may use a key mismatch attack. In the key mismatch attack a private key may be recovered for a participant's who reuses his public key by comparing whether the shared keys between two participants match or not.

Accordingly, both the first cryptographic device and the second cryptographic device have an interest to avoid working with a public key that is obtained for the other party which does not correspond to the profile that one may expect from a public key. In case of the second cryptographic device, allowing a weak first public key may result in lower confidentiality protection of the key seed and of any communication that depends on it. In case of the first cryptographic device, allowing a weak second public key may result in inadvertently revealing part of the first private key, e.g., by detecting a presence or absence of a key-mismatch. Typically, the second cryptographic device will use an ephemeral second private key and second public key so that the problem of revealing information on the second private key is not as pressing. However, if it is desired to avoid leaking information on the second private key, e.g., because this key may have longer term uses, then validation of the first public key may be performed.

In an embodiment, the second cryptographic device and/or the first cryptographic device is configured to apply a validation procedure to the obtained public key. It is possible, but not required, that both parties perform a validation on an obtained public key, as it depends on which threat is addressed.

In case of the second cryptographic device, it may be determined if the public key is secure for encapsulation of a key seed. If the obtained public key is not suitable, e.g., because the using it for encapsulation would reveal too much of the key seed, then the second cryptographic device can take appropriate action. For example, the validation procedure may be performed before or during encapsulation, and the encapsulation may not be performed or aborted if the validation procedure was not successful. For example, the validation procedure may be performed after or during encapsulation, and the encapsulation result may not be used, e.g., not transferred to the first cryptographic party if the validation procedure was not successful.

In case of the first cryptographic device, it may be determined if the public key is secure for decapsulation of a key seed. If the obtained public key is not suitable, e.g., because the using it for decapsulation would reveal too much of the first private key, then the first cryptographic device can take appropriate action. For example, the validation procedure may be performed before or during decapsulation, and the decapsulation may not be performed or aborted if the validation procedure was not successful. For example, the validation procedure may be performed after or during decapsulation, and the decapsulation result may not be used, e.g., a resulting key seed may be discarded, e.g., a warning may be issued, the second cryptographic device may be blocked, etc.

If key leakage is the objective, the bar for rejecting a key may be set relatively high, but one may keep information on devices that use suspected keys, e.g., keys that are near the bar for rejection. For example, a first cryptographic device may count how often a particular second cryptographic device used a key that is suspect, e.g., for which the statistical measure fall outside a likely range but not outside a highly-unlikely range. If unlikely keys are often used, e.g., 2 times or more, 4 times or more, etc., further keys from that second cryptographic device may be rejected.

The problem of weak keys is common in many lattice based cryptography schemes, especially when based on a so-called noisy multiplication.

For example, the shared object, first public key, first private key, second public key and second private key may be matrices over a finite field or ring. A noisy multiplication may be a matrix multiplication, e.g., in the finite field or ring. The matrix elements may be integers, e.g., modulo a modulus, or polynomials modulo a modulus and a reduction polynomial. The noisy multiplication may add noise to the result, e.g., by scaling the resulting matrix elements down, or generating noise and adding the noise to resulting matrix elements.

For example, the shared object, the first public key, first private key, second public key and second private key may be polynomials over a finite field or ring. A noisy multiplication may be a polynomial multiplication, e.g., modulo a reduction polynomial. The noisy multiplication may add noise to the result, e.g., by scaling the resulting polynomial coefficients down, or generating noise and adding the noise to resulting polynomial coefficients.

Scaling coefficients or elements may comprise multiplying with a scaling factor, adding a scaling coefficient, and flooring, rounding or ceiling operations.

In an embodiment, the key seed is random, and/or ephemeral and/or symmetric and/or independent from the first public-key.

In normal use, a public key is generated as part of a random process. Although restrictions of various kinds may be imposed on a private key, depending on the particular lattice based cryptography scheme, it will typically be randomly selected, e.g., randomly selected subjected to design constraints. For example, the private key may be selected randomly subject to being balanced, having a limited (absolute) magnitude of its values, e.g., ternary values, and/or restrictions to its weight, etc. The public key may be obtained as a noisy multiplication between the public key and the shared object.

Accordingly, a public key that statistically does not appear to be the result of such a random process may be the result of error, e.g., programming error, transmission error, etc., or may be the result of an attack. The first and second devices may be configured to check in advance if the public keys that they generate will pass a test done by the other device. However, it is not likely that this will be change much in practice, as a genuinely generated public key will pass the test with very high probability.

The validation process may compute a statistical measure for the public key and reject the public key if the statistical measure is outside an expected range for the statistical measure.

A particular problem occurs if the public key is much smaller than would be expected. For example, the validation procedure may comprise determining if the magnitude of the obtained public key is below a threshold. For example, one may mathematically calculate an expected range for the magnitude, e.g., a range in which a public keys is expected to lie with some high probability. For example, the probability may be set to $1-10^{-6}$, or higher or lower depending on the application.

On the other hand, one may calculate the expected amount of information that will be leaked if the resulting raw key is used for encapsulation. The latter method may be preferred, but may be harder to perform. By rejecting unusually small keys a similar effect can be obtained though.

For example, a validation procedure may comprise determining if a number of values below a first threshold in the obtained public key and reject the key if the determined number is smaller than a second threshold. Below a threshold may be interpreted in absolute value. If public key has values modulo p, the validation procedure may require that the number of elements just below p is small; or even that the number of elements in $[0, t_1) \cup [p-t_2)$ is small, e.g., below a threshold $t_3$.

In particular, a validation procedure may comprise determining if the obtained public key is all zero or near-all zero. For example, if the number of non-zero elements is below a threshold. A public key with many zeros may cause low confidentiality in the encapsulated key seed.

In some cryptography schemes the public key may be obtained in a transformed domain, e.g., in a frequency domain. For example, the transform may be a Fourier transform, e.g., a discrete Fourier transform (DFT). In this case, the validation may comprise determining if a norm of the public key in the transformed domain is below a threshold. This test gives an indication that the sum of the squares of the entries in the original domain is small. Alternatively or additionally, one may compute a linear combination of elements in the transformed domain and verify if it is below a threshold. This test gives an indication that the sum of the entries in the original domain is small. For example, this may be used for the NTT used by e.g., CRYSTALS-Kyber and NewHope. The linear combination of elements may be selected randomly, e.g., to avoid that an attacker can prepare for the test.

The validation procedure may comprise determining if the number of values of the public key equal to each other exceeds a threshold. Many equal values may be indicative of a weak key. Especially in a cryptographic scheme in which the private keys are balanced, e.g., have a fixed weight this may be a problem. For example, this problem may occur if ternary secret keys are used. For example, in a balanced private key with a fixed weight secrets, e.g., the same number 1 and $-1$ values, keys of the type above may be close to zero.

In an embodiment, the validation procedure is performed on the public key instead of on the raw key directly. This has the advantage that the test cannot reveal information on the private key since the private key need not be involved in the check. Alternatively, one could verify if the raw key is small, but if the accept/reject decision is visible this may give information on the private key. Especially, if the private key is a long term key this is not desirable. In an embodiment, a validation procedure for a second cryptographic device comprises determining a magnitude, number of small values, etc., for the raw key.

More sophisticated evaluation of the public key is possible using a more sophisticated statistical measure. For example, the validation procedure may comprise computing a histogram of values in the obtained public key and comparing the computed histogram to an expected histogram. The expected histogram may be computed mathematically, but may also be established empirically.

A more stringent statistical test, without being tied to a particular weakness, such being small, or having many small values, has the advantage that it is likely to help against future weaknesses as well. For example, if it is found in the future that a particular clever selection of a public key, e.g., with or without selecting a private key first may lead to a problem, e.g., a weak encapsulation or may reveal information about a private key.

For example, the validation procedure may comprise
determining if a bin of the computed histogram is smaller than a threshold, and/or
determining if a bin of the computed histogram is larger than a threshold, and/or
computing a distance between the computed histogram and an expected histogram and determining if the distance is above a threshold.

Before computing the histogram, the values in the public key may be shifted upwards or downwards, e.g., by half a bin-size. This has the effect that values that are in absolute value near 0 are counted in the same bin of the histogram.

There are various distance measures between the determined histogram in the obtained public key and the expected histogram, e.g., as mathematically or empirically established. For example, distance measures may be a squared distance, e.g., a sum of the square of the difference in size of corresponding bins. Other measures that may be used include the chi-squared test and the KS test, for example.

The second cryptographic device and the first cryptographic device may be electronic devices. For example, they may be a computer or a server, etc. They may be mobile electronic devices, e.g., a mobile phone, a smart card. The second cryptographic device and the first cryptographic device may be consumer electronics, e.g., a set-top box, a television. Public key encryption device may be sensors.

Devices and methods according to an embodiment may be applied in a wide range of practical applications. Such practical applications include a number of cryptographic protocols. Such practical applications include messaging applications, sensor networks, data communication, financial applications, etc.

An embodiment of the method may be implemented on a computer as a computer implemented method, or in dedicated hardware, or in a combination of both. Executable code for an embodiment of the method may be stored on a computer program product. Examples of computer program products include memory devices, optical storage devices, integrated circuits, servers, online software, etc. Preferably, the computer program product comprises non-transitory program code stored on a computer readable medium for performing an embodiment of the method when said program product is executed on a computer.

In an embodiment, the computer program comprises computer program code adapted to perform all or part of the steps of an embodiment of the method when the computer program is run on a computer. Preferably, the computer program is embodied on a computer readable medium.

Another aspect of the invention provides a method of making the computer program available for downloading. This aspect is used when the computer program is uploaded into, e.g., Apple's App Store, Google's Play Store, or Microsoft's Windows Store, and when the computer program is available for downloading from such a store.

BRIEF DESCRIPTION OF THE DRAWINGS

Further details, aspects, and embodiments of the invention will be described, by way of example only, with reference to the drawings. Elements in the figures are illustrated for simplicity and clarity and have not necessarily been drawn to scale. In the Figures, elements which correspond to elements already described may have the same reference numerals. In the drawings, FIG. 1a schematically shows an example of an embodiment of a first cryptographic device 100, FIG. 1b schematically shows an example of an embodiment of a second cryptographic device 200, FIG. 1c schematically shows an example of an embodiment of a cryptographic system 101, FIG. 2a schematically shows an example of public-key encryption and of private-key decryption, FIG. 2b schematically shows an example of public-key encryption and of private-key decryption, FIG. 3 schematically shows an example of public-key encryption and of private-key decryption, FIG. 4 schematically shows an example of public-key encryption and of private-key decryption, FIG. 5 schematically shows an example of a cryptographic system according to an embodiment, FIG. 6a schematically shows an example of a public-key encryption method according to an embodiment, FIG. 6b schematically shows an example of a private-key decryption method according to an embodiment, FIG. 7a schematically shows a computer readable medium having a writable part comprising a computer program according to an embodiment, FIG. 7b schematically shows a representation of a processor system according to an embodiment.

LIST OF REFERENCE NUMERALS 1a-5, 7a-7a 10 a first cryptographic device
20 a second cryptographic device
31 an enrollment phase
32 an encryption phase
33 a decryption phase
11, 12 a message
100 a first cryptographic device
130 a communication interface
191 a computer network
192 a storage interface
194 a processor
196 a memory
200 a second cryptographic device
230 a communication interface
292 a storage interface
294 a processor
296 a memory
300 a first cryptographic device
301 a cryptographic system
302 a public key depository
305 a communication interface
315 a public/private key generator
320 an error corrector
325 a Diffie-Hellman unit
335 a reconciliation unit
340 a decapsulation unit
350 a second cryptographic device
355 a communication interface
360 a public key obtainer
365 a public/private key generator
370 a code word generator
375 a Diffie-Hellman unit
380 a reliable bit generator
385 a reconciliation data generator
390 an encapsulation unit
1000 a computer readable medium
1010 a writable part
1020 a computer program
1110 integrated circuit(s)
1120 a processing unit
1122 a memory
1124 a dedicated integrated circuit
1126 a communication element
1130 an interconnect
1140 a processor system

DETAILED DESCRIPTION OF THE EMBODIMENTS

Figure 1A:
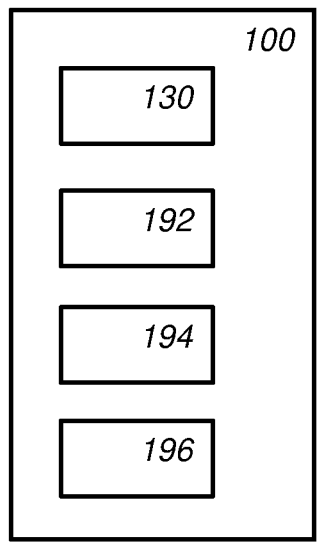

While this invention is susceptible of embodiment in many different forms, there are shown in the drawings and will herein be described in detail one or more specific embodiments, with the understanding that the present disclosure is to be considered as exemplary of the principles of the invention and not intended to limit the invention to the specific embodiments shown and described.

In the following, for the sake of understanding, elements of embodiments are described in operation. However, it will be apparent that the respective elements are arranged to perform the functions being described as performed by them.

Further, the invention is not limited to the embodiments, and the invention lies in each and every novel feature or combination of features described herein or recited in mutually different dependent claims.

Some embodiments are directed to a second cryptographic device and a first cryptographic device. The first and second cryptographic devices may be configured to transfer a key seed. The key seed may be protected using a public key from one party and a private key from the other party. For example, a public key may be obtained from a private key through a noisy multiplication. At least one of the first and second cryptographic device may validate an obtained public key, e.g., to avoid leakage of the key seed or of a private key.

Figure 1B:
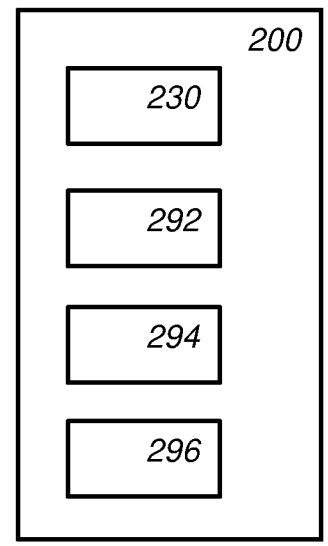
Figure 1C:
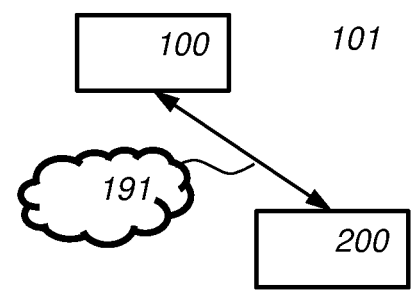

FIG. 1a schematically shows an example of an embodiment of a first cryptographic device 100. FIG. 1b schematically shows an example of an embodiment of a second cryptographic device 200. The first cryptographic device may also be referred to as the first device, or first cryptographic device. The second cryptographic device may also be referred to as the second device, or second cryptographic device. FIG. 1c schematically shows an example of an embodiment of a cryptographic system 101 comprising a first cryptographic device 100 and a second cryptographic device 200. First cryptographic device 100, and second cryptographic device 200 may comprise one or more of a storage interface 192, 292, a processor 194, 294, and a memory 196, 296, respectively. First cryptographic device 100 is configured to generate a public/private key pair. The public key and private key may comprise a public-key matrix and a private-key matrix respectively. The public key and private key may comprise a public-key polynomial and a private-key polynomial respectively. The second cryptographic device 200 is configured to use a public-key and use it to enable a key seed to be transferred to the first cryptographic device. For example, the key seed may be used directly as a key, typically as a symmetric key, to encrypt and later decrypt a message which is to be transferred from the second cryptographic device to the first cryptographic device.

The first cryptographic device may be configured to use its private-key to obtain the same key seed. For example, the key seed may also be used to derive a communication key from. For example, the key seed may be hashed, possibly with other information to obtain the communication key. For example, the other information may comprise the initial and/or the replying protocol messages exchanged between the first and second cryptographic device.

The key seed could be used as an input to a further key negotiation, e.g., the key seed may be combined with one or more further key inputs, e.g., to derive a final key, e.g., using a key derivation function taking the key seed and the further key inputs. The further key inputs may comprise a further key seed derived from a protocol in which the second cryptographic device and first cryptographic device change places, taking the opposite roles in the various protocols described herein.

The first cryptographic device 100, and second cryptographic device 200, e.g., the various devices of system 101, may communicate with each other over a computer network 191. The computer network may be an internet, an intranet, a LAN, a WLAN, etc. Computer network 191 may be the Internet. The computer network may be wholly or partly wired, and/or wholly or partly wireless. For example, the computer network may comprise Ethernet connections. For example, the computer network may comprise wireless connections, such as Wi-Fi, ZigBee, and the like. The devices comprise a connection interface which is arranged to communicate with other devices of system 101 as needed. For example, the connection interface may comprise a connector, e.g., a wired connector, e.g., an Ethernet connector, or a wireless connector, e.g., an antenna, e.g., a Wi-Fi, 4G or 5G antenna. For example, first cryptographic device 100, and second cryptographic device 200 may comprise communication interface 130, 230 respectively. Computer network 191 may comprise additional elements, e.g., a router, a hub, etc.

The execution of the first cryptographic device 100, and second cryptographic device 200 may be implemented in a processor, e.g., a processor circuit, examples of which are shown herein. The first cryptographic device 100, in particular the processor of first cryptographic device 100, may implement the functions of the first cryptographic device 10 as shown in FIGS. 2a-2b, 3 and 4. The second cryptographic device 200, in particular the processor of second cryptographic device 200, may implement the functions of the second cryptographic device 20 in these figures. For example, these functions may be wholly or partially implemented in computer instructions that are stored at device 100, or 200, e.g., in an electronic memory of the device, and are executable by a microprocessor of the device. In hybrid embodiments, functional units are implemented partially in hardware, e.g., as coprocessors, e.g., crypto coprocessors, and partially in software stored and executed on device 100, or 200.

Devices 100 and 200 may comprise a storage interface to store and/or retrieve messages, possibly encrypted messages. For example, the storage interface may be implemented locally, e.g., as an interface to a memory comprised in the device, e.g., memory 196, or 296, respectively. The storage interface may also interface with offline, e.g., non-local, storage, e.g., cloud storage, e.g., a storage such as a memory or a drive located in another device. If cloud storage is used the devices may comprise a local storage as well, e.g., a memory. For example, the memory may be used to store computer programming instructions, temporary storage of files and the like.

In the various embodiments of devices 100 and 200, the communication interface may be selected from various alternatives. For example, the interface may be a network interface to a local or wide area network, e.g., the Internet, a storage interface to an internal or external data storage, an application interface (API), etc. In an embodiment, the second cryptographic device and the first cryptographic device are implemented in the same device. This can be helpful to both encrypt and decrypt messages. For example, the communication interface may be a storage interface in which case, the device may be used to store messages in encrypted form, and later retrieve and decrypt them.

The devices 100 and 200 may have a user interface, which may include well-known elements such as one or more buttons, a keyboard, display, touch screen, etc. The user interface may be arranged for accommodating user interaction for initiating a key agreement protocol, responding to a key agreement protocol, sending a message encrypted with a public key, decrypting a message with a public key, etc.

Storage may be implemented as an electronic memory, say a flash memory, or magnetic memory, say hard disk or the like. Storage may comprise multiple discrete memories together making up storage. Storage may also be a temporary memory, say a RAM.

Typically, the devices 100 and 200 each comprise a microprocessor which executes appropriate software stored at the devices 100 and 200; for example, that software may have been downloaded and/or stored in a corresponding memory, e.g., a volatile memory such as RAM or a non-volatile memory such as Flash. Alternatively, the devices 100 and 200 may, in whole or in part, be implemented in programmable logic, e.g., as field-programmable gate array (FPGA). Devices 100 and 200 may be implemented, in whole or in part, as a so-called application-specific integrated circuit (ASIC), e.g., an integrated circuit (IC) customized for their particular use. For example, the circuits may be implemented in CMOS, e.g., using a hardware description language such as Verilog, VHDL etc.

In an embodiment, devices 100 and 200 may comprise one or more circuits to implement one or more or all of the functions of the respective device. The circuits may implement the corresponding functions described herein. The circuits may be a processor circuit and storage circuit, the processor circuit executing instructions represented electronically in the storage circuits.

A processor circuit may be implemented in a distributed fashion, e.g., as multiple sub-processor circuits. A storage may be distributed over multiple distributed sub-storages. Part or all of the memory may be an electronic memory, magnetic memory, etc. For example, the storage may have volatile and a non-volatile part. Part of the storage may be read-only. The circuits may also be, FPGA, ASIC or the like.

Figure 2A:
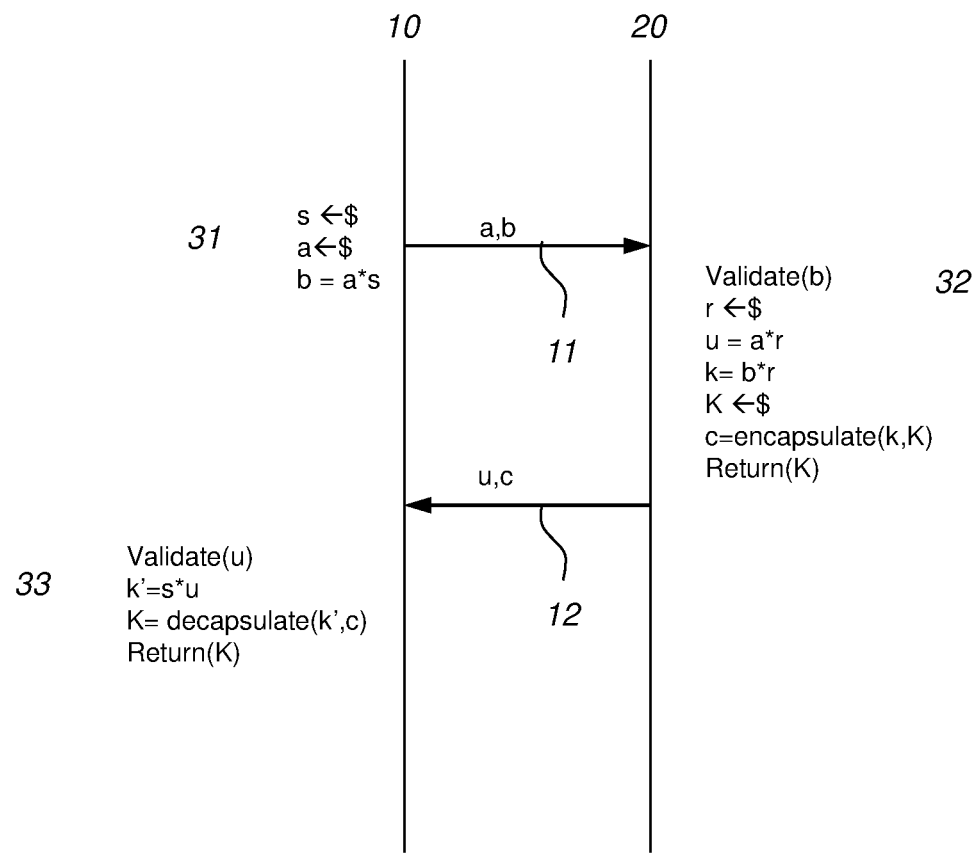

FIG. 2a schematically shows an example of public-key encryption and of private-key decryption. The public-key encryption side is performed by second cryptographic device 20. The private-key decryption side is performed by first cryptographic device 10. The protocols of FIGS. 2a-4 may be executed by a second cryptographic device 200 and/or a first cryptographic device 100, e.g., as described above.

The notation in FIGS. 2a-4 is as follows:
a represents a public object, e.g., matrix, e.g., a matrix with elements in the integers or a ring, field, etc., e.g., a polynomial, e.g., a polynomial with coefficients ring, field. The elements may be integers modulo a modulus, e.g., a power of 2. We will use 'values' or 'elements' to refer both to the coefficients of a polynomial or to the elements of a matrix The elements of the public object may be polynomials modulo a modulus, e.g., a power of 2, and a polynomial. A matrix public object a is typically a square d×d matrix. Matrices modulo a modulus are referred to as a non-ring configuration. Matrices with polynomial entries modulo a polynomial and a modulus are referred to as a module configuration.

s and r represent the private keys of the first cryptographic device and the second cryptographic device, respectively. Like the public object, the private keys may be a matrix. The private keys may be a polynomial.

b and u represent the public key matrices of the first cryptographic device and the second cryptographic device illustrated as the product of a*r or a*s. Like the public object, the public keys may be a matrix. The public keys may be a polynomial.

The operation * represents the one-way function of the underlying problem. The star (*) operation derives a new mathematical object, e.g., a new matrix, from two underlying matrices, while introducing some noise, e.g., a new polynomial, from two underlying polynomials, while introducing some noise. For example, noise may be introduced explicitly by adding noise to the elements, or implicitly, e.g., by rounding.

Examples of star operations can be found in (R)LWE or (R)LWR or a module version of them. For instance, a*r may mean Round((A*r(mod q)), p, q), e.g., as in LWR. This means the product of r times the square matrix A modulo q. Then the result is rounded with integers p and q where p<q by performing p/q (A*r(mod q). A rounding operating may be an operator $$R_{a \rightarrow b, h}(x) = \left\langle \left\lfloor \frac{b}{a}(x+h) \right\rfloor \right\rangle_b.$$

In the latter formula, the angle brackets denote a modulo operation, in this case modulo b. The floor operation, in this case is downward flooring, but this could be replaced to a ceiling or true rounding operation. The value h may be used, e.g., to reduce bias. For example, one may use h=a/2b. Typically, we have that b<a. In an embodiment, both a and b are powers of 2.

c represents the encapsulated key seed K encapsulate(k, K) means that the key seed K is encapsulated with k. For example, if k lives in Z_q, then K may be represented in Z_q too. If k lives in Z_2, then this may be an XOR. Encapsulation may be done element-wise, e.g., interpreting the k and K as a matrix as:

$c = k + K*(q/2)(\text{mod } q)$.

For example, an encapsulation function may mask a key seed K using a key k such that an error in k has a limited effect on m, e.g., a linear effect. For example, the bits in a key seed K may be mapped to Z_q, e.g., by multiplying the elements in K by an element in Z_q; if q is even than q/2 is a good choice. Next the elements of key k, which may also be elements of Z_q, are added to the mapped elements of K. Encapsulation of K may be regarded as an encryption of K with key k, but wherein a small error in the key k, e.g., a small number of bit errors, still allow successful decryption of K from c. Note that in the above example encapsulation, not all values of k need to be used. For example, if k is a matrix or polynomial, a subset of its values may be used, or even part of the value, e.g., a number of bits from a number of values.

decapsulate(k, c) means that the ciphertext c is decapsulated using key k returning a bit string.

Reference is made to:
RLWE: "On Ideal Lattices and Learning with Errors Over Rings", by Vadim Lyubashevsky, Chris Peikert, and Oded Regev,
RLWR: "Pseudorandom Functions and Lattices", by Abhishek Banerjee, Chris Peikert, and Alon Rosen,
LWE: "On Lattices, Learning with Errors, Random Linear Codes, and Cryptography", by Oded Regev.
LWR: "Pseudorandom Functions and Lattices", by Abhishek Banerjee, Chris Peikert, and Alon Rosen,
Hila5: "HILA5: On Reliability, Reconciliation, and Error Correction for Ring-LWE Encryption", by Markku-Juhani O. Saarinen The star operation may be a noisy matrix multiplication, e.g., a regular matrix multiplication followed by adding noise, e.g., a regular polynomial multiplication followed by adding noise. Adding noise may also be integrated with the multiplication. Adding noise in the star operation may be done in multiple ways. One example of adding noise, is by adding explicit noise, e.g., by generating and adding a noise matrix or polynomial. An advantage of adding explicit noise is that the noise is under complete control of the cryptographer, and can be fine-tuned, e.g., to obtain precise control over the failure rate of the system versus its security. Furthermore, adding explicit noise has the advantage that all matrices or polynomials may be over the same ring, or field, etc., thus simplifying analysis.

Another example of adding noise is scaling down. For example, the matrices a, r, and s may have elements modulo a modulus q, e.g., integers or polynomials modulo q; the star operation may round the result of a matrix operation down from modulo q to modulo p, e.g., by multiplying with p/q and rounding, e.g., rounding up, or rounding down, or rounding to the nearest integer, etc.

In this application small letters will be used for matrices or polynomials, with the understanding that matrices may need to be transposed whenever needed, e.g., as required by the dimensions of the matrices, and by the requirement that the raw key at both sides should be approximately equal. Typically, there is more than one way to do this; for example, by transposing all matrices in an embodiment, an alternative working embodiment may be obtained. Using polynomials has the advantage that the multiplication is commutative, so that no transpose operations are needed.

Below one example is given in which the matrix objects are given in capital letters, and wherein transposing is included. The secret-keys are defined as matrices $S \in \mathbb{Z}^{d \times \bar{n}}$ and $R \in \mathbb{Z}^{d \times \bar{m}}$; note that such secret-key matrices actually contain respectively $\bar{n}$ and $\bar{m}$ independent secret-key vectors. A raw key matrix equals $S^T A^T R$ and is in $\mathbb{Z}^{\bar{n} \times \bar{m}}$, except for errors introduced by noisy multiplication. From each of the entries of the raw key, the B most significant bits are extracted so that a total raw key of length $\bar{n}*\bar{m}*B$ can be generated. The raw key is referred to as 'raw', since there is a probability that the raw keys derived at the second cryptographic device and at the first cryptographic device are not exactly equal. Below an example is given, using matrices:

In an enrollment phase 31:

First cryptographic device selects a public matrix object A and a first private-key matrix S.

First cryptographic device computes first public-key matrix B=AS+E, for some error matrix E.

First cryptographic device sends: A, B

In an encryption phase 32:

Second cryptographic device selects second private-key matrix: R

Second cryptographic device computes second public-key matrix: U=$A^T$R+E'; for some error matrix E'

Second cryptographic device computes second raw key $B^T$R, note that $B^T R = S^T A^T R + E^T R$;

Second cryptographic device generates a key seed K and computes the encapsulated key seed as $$C = \left(\frac{p}{2^B}\right)K + B^T R.$$

For example, the key seed K may have entries in $\{0, 1, \ldots, 2^B-1\}$

Second cryptographic device sends: U, C

In encryption phase 32, the second cryptographic device may apply a validation procedure to the received public key. This may be denoted as Validate(B) and may be implemented as part of the encryption phase 32. Validate(B) may be performed before or after or during the encapsulation, but if the outcome of the validate(B) procedure is not successful, e.g., B is not validated, then the encapsulation result C is not transferred to the first cryptographic device. Examples, of validation procedures are given herein. For example, Validate(B) may verify that B is not zero. If B were zero, then the outcome would be unsuccessful, e.g., no validation.

In a decryption phase 33:

First cryptographic device computes first raw key $S^T$U, note that $S^T U = S^T A^T R + S^T E'$.

First cryptographic device decapsulates by computing C−$S^T$U, and rounding the result to multiples of $$\left(\frac{p}{2^B}\right).$$

Next the key seed K may be obtained from the rounding, e.g., by dividing by $$\left(\frac{p}{2^B}\right).$$

In decryption phase 33, the first cryptographic device may apply a validation procedure to the received public key. This may be denoted as Validate(U) and may be implemented as part of the decryption phase 33. Validate(U) may be performed before or after or during the encapsulation, but if the outcome of the validate(U) procedure is not successful, e.g., U is not validated, then the encapsulation result C is not decapsulated, or the result of the decapsulation, e.g., K, is discarded.

In the above example, the matrices: A, B, S, U, and R, may be over Z_p. The value B in the exponent $2^B$ indicates the number of most significant bits taken from the raw keys to encapsulate K. In this example, the remaining lesser significant bits may be used as reconciliation data. For example, B=4 bits may be taken for encapsulation. For example, the modulus may be chosen as p=$2^{12}$. The key seed may be encoded as a matrix, with entries in Z_$2^B$, e.g., with entries chosen from $\{0,1, \ldots, 2^B-1\}$. Matrices E and E' may be matrices for which the entries are small modulo p. For example, they may be chosen from the set $\{0,1,\ldots,w-1\} \cup \{p-(w-1), p-(w-1)+1, \ldots, p-1\}$ with small w. The size of w is chosen to balance the security with the failure rate of the system. Low values of w decrease the failure rate of the system.

Matrix C may be computed modulo p. For bandwidth efficiency reasons, the second cryptographic device may compute and send $$C = \left(\frac{t}{2^B}\right)K + B^T R \bmod t$$

where t divides p. In recovering K, the private key decryption device computes $$\left(\frac{p}{t}\right)C - S^T U$$

mod p. In this case, fewer bits of the raw key are utilized as reconciliation data than are available. Generally, the lesser significant bits have less impact on the failure probability.

Instead of using error matrices, the example may be modified to scale down in the star operations to add noise instead of adding explicit noise. Scaling down has the advantage that bandwidth is reduced. Instead of using matrices, the example may be modified to use polynomials.

Returning to FIG. 2a. Shown are an enrollment phase 31 in which the first cryptographic device 10 generates its private and public key matrices, and makes the public key available to the public key encryption device 20. For example, the public key may be sent to device 20. For example, the public key may be deposited in a public-key database, from which device 20 may retrieve it. For example, devices 10 and 20 may be different devices, or may be the same device.

During enrollment phase 31, device 10 generates a first private-key matrix (r) and computes a first public-key matrix (b) from the first private-key matrix (r). For example, device 10 may generate a public matrix (a), and compute the first public-key matrix (b) as a noisy matrix multiplication between the first private-key matrix (r) and the public matrix (a). Transfer of the first public-key matrix (b) from the first cryptographic device to the second cryptographic device 20 is arranged. For example, the first public-key matrix (b) may be sent from the first cryptographic device to device 20 in a message 11.

The public matrix (a) is shared between the second cryptographic device and the first cryptographic device, the first public-key matrix (b) being associated with the public matrix (a). For example, the public matrix is transferred to device 20 in the same way as the public key matrix (b). Typically, matrix a will be generated pseudo randomly from a seed. The matrix can be shared by sending the seed.

The encryption phase 32 may be later, even much later, than the enrollment phase 31. In the encryption phase 32, device 20 generates a key seed (K), generates a second private-key matrix (s), and computes a second public-key matrix (u) from the second private-key matrix (s). For example, device 20 may obtain the public matrix (a) associated with the first public-key matrix (b), and compute the second public-key matrix (u) as a noisy matrix multiplication between the second private-key matrix and the public matrix (a). The public matrix may be obtained in the form of a seed from which the public matrix generated. In an embodiment, the public matrix is obtained from a different source. For example, both device 10 and device 20 may obtain the public matrix from a third party.

Generating the key seed may be done randomly.

Device 20 is configured to compute a second raw shared key (k*) from the second private-key matrix (s) and the first public-key matrix (b), computing the second raw shared key comprising a matrix multiplication between the second private-key matrix (s) and the first public-key matrix (b), encapsulate the key seed (K) with at least part of the second raw shared key by applying an encapsulation function, obtaining encapsulated data (c), and transfer the second public-key matrix (u), and the encapsulated data (c) to the first cryptographic device. For example, the second public-key matrix (u), and the encapsulated data (c) to the first cryptographic device may be sent in a message 12.

Note that this allows the key seed to be independent from the raw key. This increases resilience against active attacks.

After the first cryptographic device receives from the second cryptographic device the second public-key matrix (u) and the encapsulated data (c), the first cryptographic device can proceed in a decryption phase 33 to compute a first raw shared key (k') from the second public-key matrix (u) and the first private-key matrix (r), compute the first raw shared key comprising a matrix multiplication between the second public-key matrix (u) and the first private-key matrix (r), and decapsulate the encapsulated data (c) using at least part of the first raw shared key (k') to obtain a key seed.

Interestingly, in an embodiment, the second public-key matrix (u) has fewer matrix elements than the first public-key matrix (b). If all the matrices were square and of the same dimension, then the second public-key matrix (u) and the first public-key matrix (b) would have the same number of elements, but this not needed. This in turn would mean that the contribution of the public keys to the messages 11 and 12 would be equal. However, the circumstances in which these messages are sent and the devices by which they are sent may be quite different. By selecting the size of the second public-key matrix (u) to be smaller than the first public-key matrix (b) the bandwidth requirement for message 12 is reduced while the bandwidth requirement for message 11 is increased.

In an embodiment, the public matrix a is a square matrix of dimensions d×d. The first private-key matrix r and first public-key matrix b have dimensions d×$\bar{n}$. The second private-key matrix s and second public-key matrix u have dimensions d×$\bar{m}$. For example, one may use $\bar{m}$=$\bar{n}$, but this is not needed. Interestingly, the security of the system is believed to depend more on the system dimension d and on the product B$\overline{nm}$, than on the individual sizes of $\bar{n}$ and $\bar{m}$. The latter indicates the length in bits that can be used to derive the raw key. The former influences the size of the underlying lattice and thus the hardness of the underlying cryptographic problem. The probability of decryption failure of the scheme depends in part on the value of B. Higher values of B worsen the failure rate and adversely affect the security of the PKE scheme against adaptive active attacks. Typically, B is fixed, e.g., in the form of standardized parameter sets.

Interestingly, the second dimension ($\bar{m}$) of the second public-key matrix (u) need not be pre-determined. It can be chosen independent of the choices made for the first private and public-key. In particular, it may be chosen independent on the dimension ($\bar{n}$). In an embodiment, the second dimension ($\bar{m}$) is configurable at the second device 20. In Round5 many examples of matrix or polynomial dimensions are given. For example, one may use: (cf. Round5, Table 14, page 58)

| Small ciphertext configuration | |
|---|---|
| d, n | 757, 1 |
| q, p, t | $2^{14}, 2^9, 2^4$ |
| B, $\bar{n}$, $\bar{m}$ | 1, , 192 1 |
| μ | 192 |

In the Above Table:

n: indicates the degree of polynomials in the private and/or public matrices. A value of n=1 indicates that integers modulo a modulus are used. The value n may be referred to as the "ring dimension", e.g., the degree of the chosen polynomial ring.

d indicates the system dimension, e.g., number of columns and rows the public matrix a, μ indicates the number of elements of the raw key matrix that are used to encapsulate the key seed. These elements may be pre-determined, e.g., standardized, or may be randomly selected, or may be purposely, e.g., as reliable elements, etc. The shared-secret key length is thus μB; in the above example this is 192×1=192.

In an embodiment, active security may be further enhanced using a more elaborate encapsulate function, e.g., as in algorithm 9, in "Round2: KEM and PKE based on GLWR", by Hayo Baan, et al. If so, the ciphertext may comprise a hash g, which may be computed by the second cryptographic device by hashing the public-key of the private key decryption device. The hash may be used to ensure that the final shared-secret contains contributions from both the first cryptographic device and the second cryptographic device. For example, the Fujisaki-Okamoto transform may be used. The hash may for example be the size of the shared secret, in this example 256 bits.

As pointed out above, the key seed may be used to encrypt a message m. For example, the second cryptographic device may be configured to encrypt the message (m) with the key seed, and to transfer said encrypted message to the first cryptographic device. The first cryptographic device may receive the encrypted message from the second cryptographic device, e.g., together with the second public-key matrix and the encapsulated date and decrypt the encrypted message with the key seed.

In an embodiment, the key seed is independent from the first public-key matrix (b). For example, key seed K may be generated without using first public-key matrix (b), for example, the key seed may be generated randomly, and/or generated before first public-key matrix (b) is received at device 20.

Likewise, the key seed may be independent from the first private key matrix (r). The key seed may be computationally independent from the second private-key matrix (s) and second public key matrix (u), encapsulated data (c). Computationally independent means that within the computational bounds of the attacker, knowledge of the second private-key matrix does not provide information on the key seed.

Key seed K is typically used temporarily, e.g., it may be ephemeral, e.g., used only to encrypt a single message m, or a single session, protocol, handshake or the like. Key seed K may be a symmetric key, e.g., used as a key in a block cipher.

For example, device 20 may be configured to delete the key seed encrypting the message and/or the second private-key matrix after encapsulating the key seed. For example, the key seed and/or second private-key matrix may be deleted before sending the encapsulated data to device 10. Likewise, device 10 may delete the key seed after decrypting the message.

In an embodiment, the second private-key matrix is derived from the key seed. For example, the key seed may be generated randomly, either true or pseudo, and then used as an input to a key derivation function, e.g., a hash function to derive a seed; there may be additional inputs, e.g., the message, the first public-key matrix, etc. The seed is then used to generate the second private-key matrix, e.g., as a deterministic pseudo-random function depending on the seed. The key derivation function is preferably chosen such that the key seed cannot be computed from the second private-key matrix.

This has the effect that after device 10 derived the key seed, device 10 can reconstruct the second private-key matrix from the key seed, e.g., by applying the same key derivation function and computing the second private-key matrix from it. Next, device 10 can verify if the second public key and/or the encapsulated data was computed correctly. This has the advantage that active attacks are much harder to accomplish. If device 10 finds an anomaly, e.g., a difference between the received data and the recomputed second public key and/or the recomputed encapsulated data, the device 10 may take appropriate action, e.g., generate a warning signal, abort decrypting the second message, etc.

Deriving the second private-key matrix from the key seed has the advantage of increasing the security towards that of a CCA-secure system. This is advantageous, especially if a first public-key matrix is generated once and used for many messages.

In an embodiment, the processor of the second cryptographic device is configured to compute helper data to reduce the error rate in obtaining the key seed at the first cryptographic device. It is the nature of public key encryption based on noisy matrix multiplication that there is a chance that reconstruction of the key seed at the side of the private-key decryption key may fail. The failure probability can be reduced in various ways, one of which is to compute and send helper data which helps the private key decryption device to reach the correct key seed.

For example, the first cryptographic device may be configured to receive helper data from the second cryptographic device, and to apply the helper data to reduce the error rate in obtaining the key seed at the first cryptographic device.

There are several types of helper data that may be used. In the example given above, one approach was used, so called reconciliation data. Part of the second raw key may be used to encapsulate the key seed, and part of it may be used as reconciliation data.

For example, in an embodiment, the second raw key is a matrix, encapsulating the key seed (K) may comprise adding bits of the key seed to a most significant part of at least part of the elements of the second raw key matrix, and discarding zero or more least significant bits of the at least part of the elements of the second raw key matrix. In an embodiment, all of the bits which are not added to the key seed to encapsulate it may be used as reconciliation data. However, to reduce bandwidth one or more of the least significant bits may be discarded. Note that not all matrix elements of a raw key matrix need to be used. Elements which are not used, can be discarded in their entirety. At device 10, decapsulating the encapsulated data may comprise discarding zero or more least significant bits of at least part of the elements of the first raw key matrix, subtracting the at least part of the elements of the first raw key matrix from the encapsulated data, and rounding the subtracting result. Interestingly, the helper data is easily integrated in the encapsulated key seed.

In an embodiment, the second cryptographic device is configured to one or more of the following:
a) apply a reliable bit function to the second raw shared key (k*) selecting the part of the second raw shared key, obtaining reliable indices indicating elements of the second raw shared key, bits for encapsulation being derived from the indicated elements, and transfer the reliable indices to the first cryptographic device, and/or
b) generate reconciliation data (h) for the at least part of the second raw shared key, the reconciliation data comprising information allowing reducing of differences between the first and second raw key derived at the second cryptographic device and the first cryptographic device, and transferring the reconciliation data (h) to the first cryptographic device, and/or
c) generating parity bits for the key seed, the key seed and the parity bits forming a code word according to an error correction code, encapsulating the key seed comprising encapsulating the code word.

Likewise, the first cryptographic device may be configured to one or more of the following:
a) receive reliable indices from the second cryptographic device, selecting the part of the first raw shared key indicated by the reliable indices,
b) receive reconciliation data (h) for the at least part of the first raw shared key (k'), the reconciliation data comprising information allowing reducing of differences between the first and second raw key derived at the second cryptographic device and the first cryptographic device, apply a reconciliation function to the at least part of the first raw shared key and the reconciliation data, and
c) decapsulate the encapsulated data (c) to obtain a near-code word, apply an error correcting according to the error correcting code.

Figure 2B:
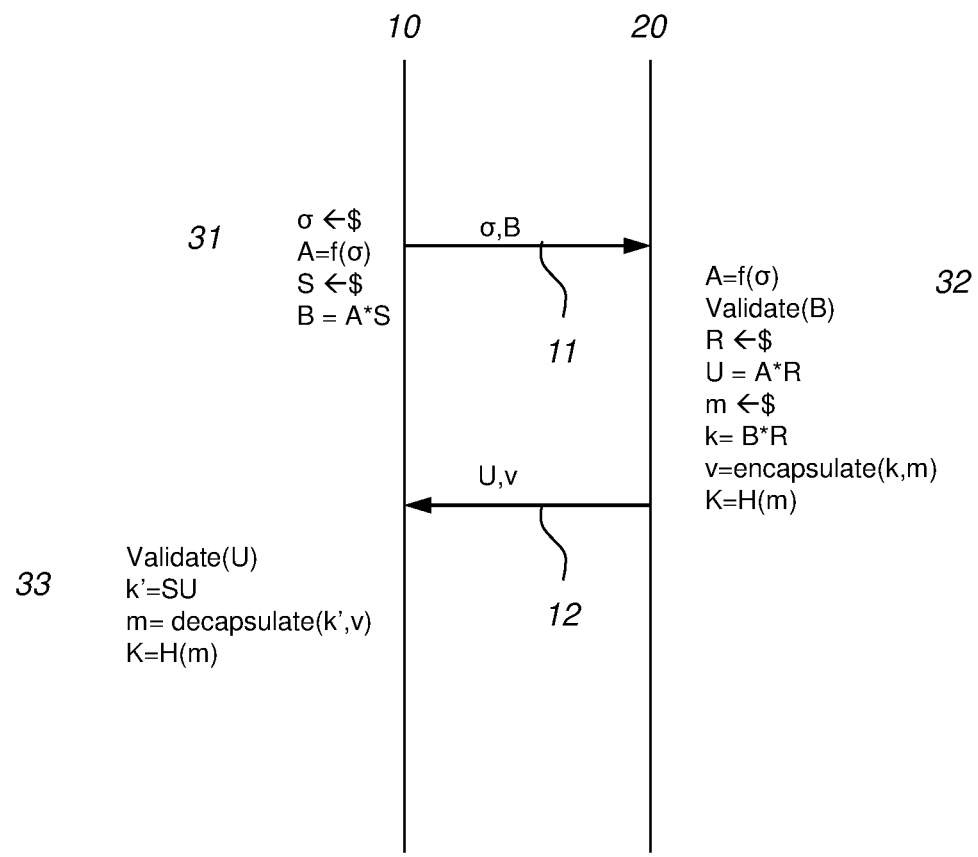

FIG. 2b schematically shows an example of public-key encryption and of private-key decryption. The public-key encryption side is performed by second cryptographic device 20. The private-key decryption side is performed by first cryptographic device 10. The various elements of the protocols illustrated with reference to FIG. 2b may be implemented using the algorithms and/or formula's shown in Round5.

Enrollment phase 31 may comprise the selection, e.g., random selection of a seed a, from which a public object, e.g., a matrix or polynomial may be derived. Likewise, a first private key S, may be generated, e.g., randomly generated. For example, first private key S may have elements which are bound in absolute value, e.g., a value $|x| \leq s$, e.g., s=1. Larger values of s are also possible. The latter are referred to as ternary secrets. S may be generated subject to other conditions, e.g., a particular weight or weight limit, or balanced, etc. A public key B is computed from public object A and S using a noisy multiplication. For example, a multiplication AS may be computed which may be reduced modulo a reduction polynomial and/or modulus if needed. Next the multiplication result may be noisied, e.g., by applying a scaling operator $R_{q \to p, h_1}$. Enrollment phase 31 may comprise algorithm 1 from Round 5.

Encryption phase 32 may comprise validating B, as further explained below. A second private key R may be generated, e.g., using the same or similar procedure as used for first private key S. The second public key may also be computed in a similar way. However, if matrices are used, a transpose of public matrix A may be used. The result of the multiplication may be nosied, e.g., by applying a scaling operator $R_{q \to p, h_2}$.

A key seed m may be selected, e.g., randomly selected.

A raw key may be computed from the second private key R and the first public key B, e.g., using a noisy multiplication. Also here, it may be needed to add a transpose, e.g., to B. Adding the noise may be done directly after the multiplication, but may also be integrated with the rest of the encapsulation operation. The key seed m may be encapsulated with the raw key.

For example, the multiplication may be reduced modulo a polynomial or integer modulus, as needed. From the result, a number of bits may be taken for the encapsulation. For example, one or more or all of the values may be selected from which one or more of the bits may be used. The key seed m may be encapsulated with the bit taken from the raw key.

Before adding the raw key (or part thereof) an error correcting algorithm may be applied to the key seed m, e.g., the xef_compute algorithm. One way to encapsulate is to scale the key seed, or the code word, up by multiplying with a factor, for example, the factor may be q/2 or q/4, etc. Finally, the noise may be added by applying a scaling operator $R_{q \to t, h_2}$. Encrypting phase 32 may comprise algorithm 2 of Round5. The second public key and the encapsulated value v are transferred to the first cryptographic device.

A communication key, or further key, or transmission key K, may be computed from the key seed by applying a hash it. The hash may comprise further information, e.g., the second public key, the encapsulated key seed, etc. The communication key K may be used for further communication, not shown in FIG. 2b, e.g., as a symmetric key, e.g., for a block cipher, mac operator, and the like. Encrypting phase 32 may comprise algorithm 2 of Round5, e.g., Algorithm 5 or 8.

Decrypting phase 33 may comprise applying a validation procedure to the second public key U. A second raw key is computed from the second public key U and the first private key S, e.g., by multiplication, possibly followed by modulus operation for an integer and/or polynomial modulus. Note that adding noise is not needed here. The second raw key is used to decapsulate the key seed m. If S is a matrix, then a transpose may be needed. Note that the computing the raw key may be combined with a round constant, e.g., as $S^T$ (U+$h_4$J). If the key seed is encapsulated as a code word, an error correcting algorithm may be applied, e.g., xef_decode. Decrypting phase 33 may comprise Algorithm 3 of Round 5. Finally, the communication key K may be obtained in the same manner as the second cryptographic device did. For example, decryption phase 33 may comprise algorithm 6 or 9.

Many variants are possible on the algorithms shown with respect to FIGS. 2a and 2b; various additional steps can be included or some of the shown one may be omitted. For example, Reliable bits are bits that are more likely to be computed equally at both sides. For example, some elements of the raw key matrix may be determined as reliable while others, that are unreliable, may be discarded. For the selected matrix elements, reconciliation data may be obtained. Finally, parity bits may be computed to compute still further errors. These three types of helper data are independent, as each one, or each two, or all three, may be used to reduce the failure rate of the private key decryption.

Figure 3:
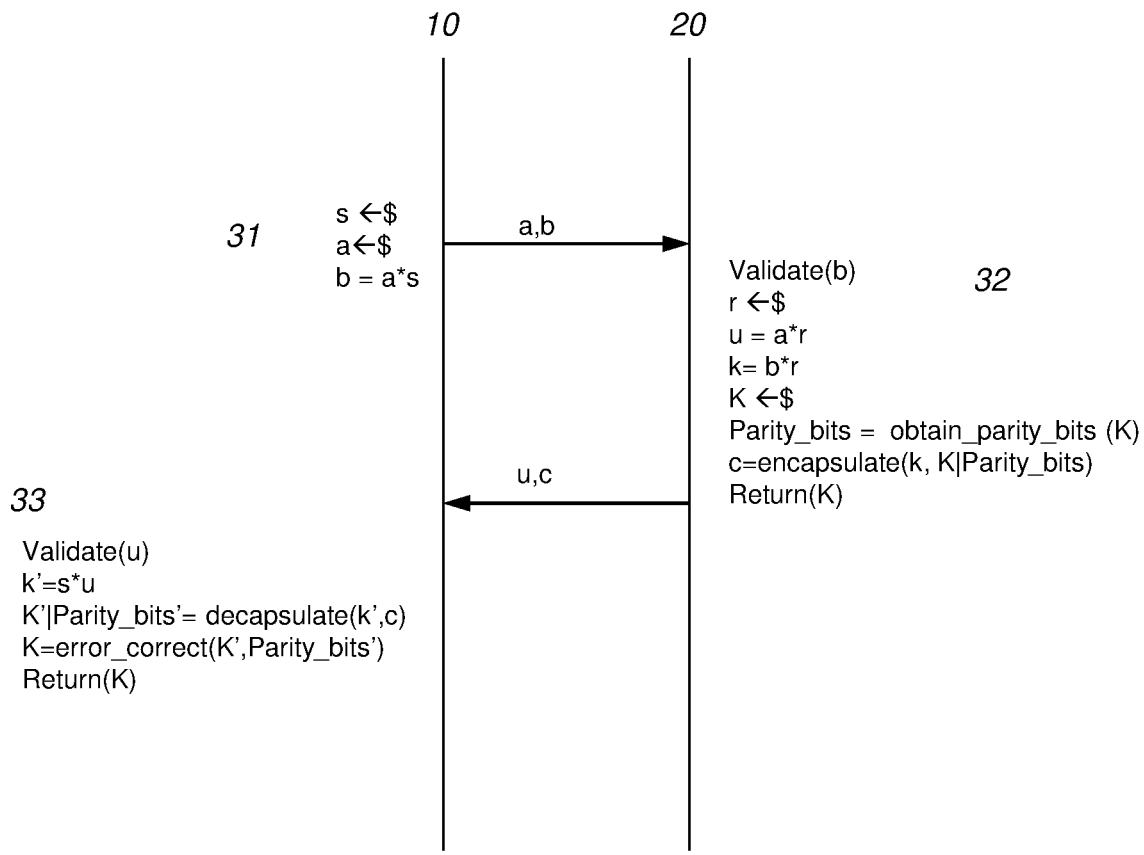

In an embodiment, reconciliation data and parity bits may be combined but not reliable bits. An advantage of this approach is that no information regarding the sizes of elements needs to be shared. Helper data may be included in the encapsulated data, but may also be transferred from device 20 to device 10 independently. Reconciliation data may be conveniently integrated with the encapsulated key seed, e.g., as illustrated herein. An example of an embodiment in which parity bits and reconciliation data are combined but not reliable bits is illustrated in FIG. 3.

In an embodiment of the second cryptographic device or first cryptographic device the reliable bits are one or more most significant bits of the indicated elements, a reconciliation data for an indicated element are one or more bits of the indicated elements following the reliable bits in significance, one or more least significant bits of the indicated elements may be discarded. The indicated elements, that is, the reliable elements, may be communicated from the second cryptographic device to the first cryptographic device, e.g., their position in the matrix.

In an embodiment of the first cryptographic device, the elements in the raw key indicated by the reliable indices are selected and replaced with modified elements agreeing with the corresponding reconciliation data. For example, the modified elements may minimize the lee-distance between the selected element and the modified element. The reliable bits may be obtained as one or more most significant bits of the modified elements.

In an embodiment, the modified elements are determined so that they agree with the corresponding reconciliation data that they would not have been discarded by the second cryptographic device. The modified elements minimize the lee-distance between the selected element and the modified element.

The public-key encryption according to an embodiment may be used in various existing protocols. For example, embodiments may be integrated with protocols such as TLS, IPSec, VPN. For example:

TLS1.3: client sends client hello. The client hello, may comprise a public-key. Instead of having the public-key, the client hello may include a URL indicating where the public-key can be downloaded. If the server does not have the public-key yet, e.g., cached, then the server may proceed to download the public-key and store it locally. With the public-key, the server can encrypt a symmetric-key or key-seed and send it to the client so that it may be used as the master key from which the symmetric-keys for the record layer are derived. In this example, the client functions as a first cryptographic device.

TLS1.2: in this example, it is the other way around. The client may send a request, and the server sends a URL where the server public-key can be obtained. The client may download if the public-key is not available yet. And once the client has the public-key, it can proceed to encrypt a key seed, e.g., to be used in the record layer. In this example, the client acts as a second cryptographic device.

Note that public-keys may be pre-distributed. For example, in a browser, one or more, e.g., a plurality of public-key matrices may be pre-distributed. For example, a public-key may be indicated with a public-key ID, e.g., a hash of the key, so that the software, e.g., the browser can verify if the public-key is obtained through pre-distribution. In the pre-distribution scenario, the asymmetry in bandwidth is an advantage. For example, during pre-distribution it is not a problem if the public key matrices are larger, but during use, the size of the messages is reduced. Also in, say, a VPN, e.g., TLS based, the public-keys may be pre-configured in one or both of the communicating parties.

In an embodiment, device 10 may be configured to send a first hello message that lists cryptographic information, e.g., such as the SSL or TLS version, or, in the client's order of preference, the CipherSuites supported, etc. In response to the first hello message, device 20 may send a second hello message. The second hello message may contain similar details. Device 20 may also send its digital certificate in the second hello message. Device 10 may verify the certificate. The first and/or second hello message may comprise a public-key or an indication of a public-key. In the second hello message and/or a subsequent message one or more key seeds are agreed on. A key seed may be used to encrypt or authenticate subsequent communication between device 10 and 20. If multiple key seeds are agreed, they may be combined into a single key, e.g., they may be hashed together, or XOR-ed, etc.

FIG. 3 schematically shows an example of public-key encryption and of private-key decryption. In FIG. 3, the following notation is used.

parity_bits refers to the information used for error correction obtain_parity_bits(k) means that some parity bits of k are obtained. For example, parity bits may be generated according to an error correcting code.

error_correct(k, parity_bits) means that the parity_bits are used to correct potential errors in either k or parity_bits obtaining a version of k that is more likely to be error free The embodiment according to FIG. 3 uses a different type of helper data. For example, according to an embodiment, device 20 computes parity bits for the key seed. For example, the parity bits together with the key seed may be a codeword according to an error correcting code, e.g., a BCH code. The code word is encapsulated with the raw key, e.g., as described herein. The encapsulation may include reconciliation data if needed. To decapsulate, device 10 first applies reconciliation data, obtaining a near-code word, e.g., a code word with possible bit-errors therein. The near-code word may be corrected using an error correction algorithm associated with the error correcting code. The use of error correction and reconciliation data improves the decryption failure probability, thus allowing smaller parameters, and improving performance through smaller key-sizes. The combination of parity bits and reconciliation data is a preferred combination, allowing a small size of the public-key matrix.

In an embodiment of the protocol, the first public-key contains $\bar{n}$ vectors. The ciphertext comprises the second public-key u and the encapsulated data c. The second public-key matrix u may be a vector of dimension d with elements in Z_p. To minimize the size of the ciphertext, we may use $\bar{m}=1$. This means that the raw key will have at most $B\bar{n}$ elements. To optimize the size of the raw shared secret, we will take B bits from as many elements as possible, thus using $\mu=\bar{n}$. The encapsulated data c encrypts the key seed and may have $\mu=\bar{n}$ elements so that a key seed of length $\kappa=\mu B$ can be encapsulated. B is the number of bits extracted from each vector entry. It is not needed that $\bar{m}=1$, for example, one may have $\bar{m}>1$, e.g., $\bar{m}=\bar{n}$.

The first public-key matrix may comprise $\bar{n}$ vectors of length d. With this, one can encapsulate $\bar{n}B=\kappa+\text{parity\_bits\_length}$, wherein K is the key seed length and there are parity_bits_length bits that serve as parity bits.

The vector c will become parity_bits_length×log$_2$ t longer since additional parity bits need to be transmitted. However, because of those parity bits, this scheme can deal better with decryption errors so that smaller values of q and p can be chosen. Since p is smaller, also d may decrease since we can keep the same security level. In summary, by adding error correction code in this way, we can further decrease the size of the ciphertext even if it comes at the price of a longer public key. The choice B=1, is efficient, and using it we need then $\bar{n}=\kappa+\text{parity\_bits\_length}$, The parity bits allow for the correction of bit errors. For example, one may use the error correcting code XEf, which allows the correction of 3 bit errors. Xef is described in "Round5: Compact and Fast Post-Quantum Public-Key Encryption", by Sauvik Bhattacharya, et al. An advantage of using XEf is that the decoding can be done efficiently in constant time, thus avoiding timing attacks.

In this embodiment, the ciphertext size would be a bit more than 1 KB. This implies that such a construction can enable non-ring configurations that do not require fragmentation of the ciphertext. It is important to reduce the size of the ciphertext to under, about 1,5 kb, since this avoid fragmentation in packet based communication, in which packets are about 2 kb as used, e.g., on the internet.

Note that the amount of noise introduced by scaling is relatively high. In the above example, 16 bits for the secret matrix elements is reduced to 8 bits for the public matrix elements; that is a reduction of 50%. Compared to the example without parity bits given earlier, 14 bits are reduced to 12 bits, a reduction of about 15%. Likewise, the difference between bit lengths of the secret versus public bits has increased from 2 bits to 8 bits. The higher noise allows for a higher efficiency in the lattice part of the protocol, but at the price of a higher failure rate. The latter is then reduced using the parity bits.

In an embodiment, $\bar{m}=1$ and $\bar{n}=\mu=\kappa+\text{parity\_bit\_length}$. For example, with $\kappa \geq 128$. For example, the number of parity bits may be chosen so that they can correct at least 3 errors. In an embodiment, the $\log_2 p/\log_2 q \leq 0.85$, or $\leq 0.72$, or $\leq 0.7$, or $\leq 0.6$, or even as in the above embodiment 0.5, or even less. Note that no use is made of so-called reliable bits, since all elements in the raw shared key are used, e.g., $\mu=\bar{n}\bar{m}$. Such high noise may be combined with low $\bar{m}$, in particular with $\bar{m}=1$, or $\bar{m}=2$, etc.

Figure 4:
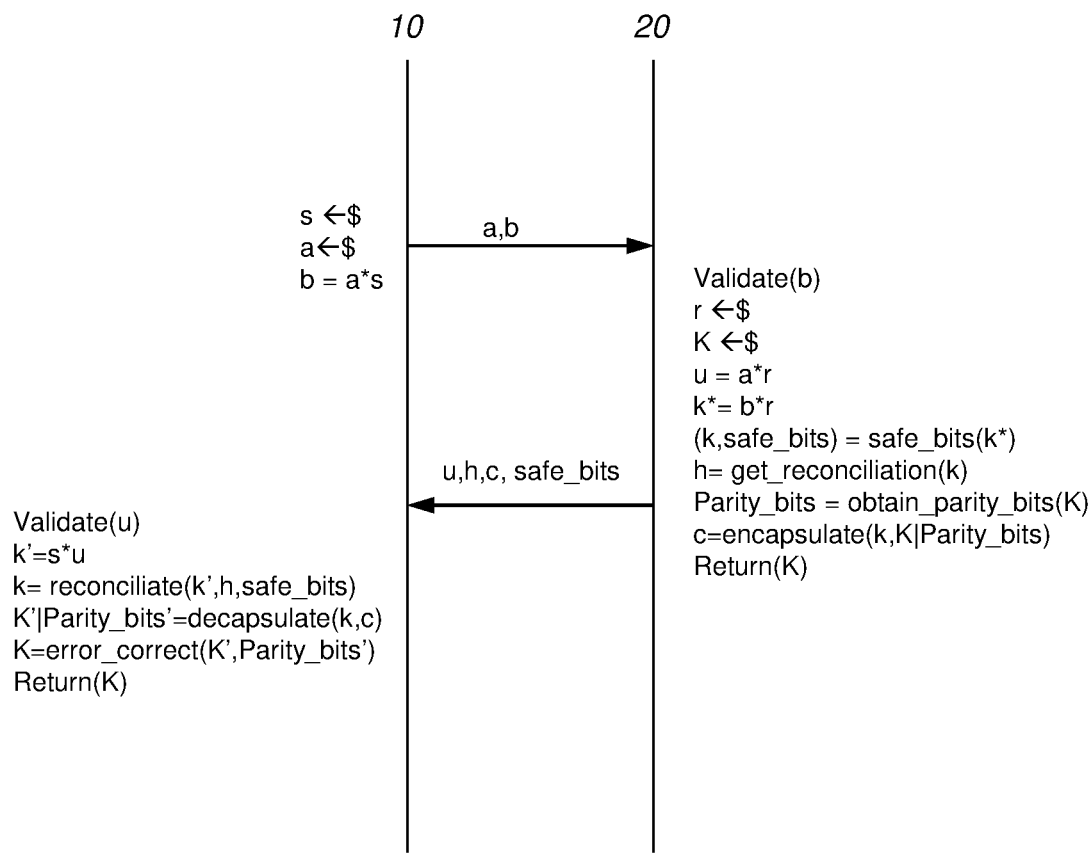

FIG. 4 schematically shows an example of public-key encryption and of private-key decryption. The embodiment of FIG. 4 includes three different sources of error correction: safe bits, reconciliation data and parity bits.

In FIG. 4:

h represents the helper data including reconciliation bits get_reconciliation(k) is a function that returns reconciliation bits out of raw_key k.

reconciliate(k,h) is a function that reconciliates raw_key k given reconciliation bits h.

safe_bits( ) returns two values: (i) the actual reliable values and (ii) the positions of the key bits that can lead to lower failure probability since the obtained values are further away of the quantification boundaries. The actual values returned by Safe_bits( ) are later used, e.g., for encapsulation. The positions are exchanged to the other party so that it knows which positions are needed.

Interestingly, the three sources of information may be used to reduce failure probability when exchanging the code word, and a randomly generated key from it. Moreover, because a code word can be generated randomly, active security is improved; note that the second private-key matrix may be derived from the code word to further improve active security. The code word may comprise the key seed and parity bits. These sources include the use of reliable bits, the reconciliation data extracted for coefficients of a raw key, and error correcting redundancy information which is part of the code word, e.g., parity bits.

It should be emphasized that it is not needed to combine different ways to reduce failure probability. For example, the use of safe bits or reliable bits is entirely optional.

For example, in an embodiment the device 10 and 20 may agree on a raw key, say a matrix key k* with n coefficients in Z_q. For example, an element in a raw key matrix may be mapped to part of a key seed, e.g., to one or more bits. For example, half of the values in Z_q may be mapped to 0 and half of them to 1, e.g., B=1. Selecting reliable bits may be done by selecting, e.g., some number, say mu, of coefficients that are furthest away from the decoding boundary so that the likelihood of making an error is lower.

Key reconciliation data may be information which is extracted by the second cryptographic device, e.g., for the chosen, reliable coefficients, say the chosen mu coefficients, of the raw key, say the matrix key. The reconciliation information helps the first cryptographic device to come to the same decision, whether a specific coefficient of the raw key is mapped to what part of the code word. Not that this need only to be done for the selected reliable coefficients, which means that less work is needed.

Error correction information may be parity bits. Parity bits may be extracted from the randomly generated binary key K, message m or pre-key so that the information that the second device encapsulates has some redundancy. In this way, even if errors are made before, device 10 can correct them. So if you want to transmit a key K that is kappa bits long and there are (mu—kappa) parity bits, these parity bits help device 10 to make sure that the kappa bits of the key K are correct.

A problem of many quantum resistant public-key encryption is that they have some failure probability. For example, a first cryptographic device and a second cryptographic device initially agree on a noisy raw key, which is then reconciled, e.g., through reconciliation data. A reliable bit function allows the second cryptographic device, e.g., the party that first derives the raw key, to identify which bits in the raw key are more likely to be derived in the same way by the first cryptographic device, and which bits in the raw key are less likely to be the same.

A straightforward implementation of a reliable bit function defines two or more center points for the coefficients that are sampled to obtain key bits. Coefficients that are too far away from the center points, e.g., according to a threshold, may be discarded whereas the remainder may be sampled to a value associated with the center point. For example, the number of center points may be a power of 2. For example, the matrix elements may be taken from a variety of different rings and the like.

Reliable bit sampling uses the assumption that not all bits given by a ring dimension are needed for the keys. Typically, the dimension of the underlying matrices $\gamma$ is much larger than the required key length. For example, the second cryptographic device may select m indexes in $\gamma$ that are most likely to agree. These safe coefficients may be those that are closest to center points of the coefficients ranges that are mapped to a zero bit or to a one bit; k=0 and k=1. For example, in a ring modulo q a coefficient may be mapped to 0 if it is in the range $$\left[\left\lfloor \frac{q}{4} \right\rfloor - b, \left\lceil \frac{q}{4} \right\rceil + b\right]$$

and to 1 if it is in the range $$\left[\left\lfloor \frac{3q}{4} \right\rfloor - b, \left\lceil \frac{3q}{4} \right\rceil + b\right],$$

or vice versa. If the coefficient is in neither range it is not a reliable bit. The value b determines, in part, the reliability of the bits. For example, in this case it may be chosen as q/8; smaller values for b provide more reliability but less key bits. In this case the center points may be q/4 and 3q/4, or a rounding thereof.

The second cryptographic device who applies the above procedure, obtains indices of reliable bits and key bits that correspond to them. The reliable indices may be communicated to the first cryptographic device, the reliable key bits are not. The first cryptographic device can obtain key bits from the bit at the indices indicated by the second cryptographic device. As these bits are more reliable, the error rate will be lower.

Further implementations of a reliable bit functions can be found in the paper Hila 5, included herein by reference. For example, the algorithms in section 3 may be applied. The inventors found that reliable bit functions may be applied in a range of situations, e.g., with different underlying rings or objects, e.g., in particular on matrices.

In embodiments, the two parties generate two raw keys, e.g., matrices that are approximately, but not exactly equal. To come to exact agreement, some reconciliation data is sent. A scheme for doing so is explained in a patent application of the same applicant, with title "REACHING AGREEMENT ON A SECRET VALUE", filed at the EPO on 4 Nov. 2016, with application Ser. No. 16/197,277.3; for example, the method on pages 7-10 may be used for reconciliation in embodiments. Variants disclosed elsewhere in the cited patent application may also be adopted.

In this application, we will use the following notation for the following three functions:

1. Rounding Function $\lfloor \cdot \rceil_{B,b_h}$: For q, $b_h$, B $\in$ Z, $b_h \geq 1$, B<$\log_2$ q−$b_h$, let $\bar{B}=\log_2 q - B$. Then, $\lfloor \cdot \rceil_{B,b_h} : v \rightarrow \lfloor 2^{-\bar{B}} \cdot v \rceil \pmod{2^B}$ Intuitively, $\lfloor v \rceil_{B,b_h}$ extracts the B most significant bits of $\{v + 2^{\log q - (B+b_h)}\}$, where the second component is a rounding factor to ensure unbiased rounding errors. B indicates the number of bits that are extracted form a symbol v, and $b_h$ indicates the number of helper data bits. In an embodiment, q may be a power of 2.

2. Cross-Rounding Function $\langle \cdot \rangle_{B,b_h}$: For q, $b_h$, B $\in$ Z, $b_h > 1$, B<$\log_2$ q−$b_h$, let B=$\log_2$ q−B. Then, $\langle \cdot \rangle_{B,b_h} : v \rightarrow \lfloor 2^{-B+b_h} \cdot v \rfloor \pmod{2^{b_h}}$ Intuitively, $\langle v \rangle_{B,b_h}$ extracts the $b_h$ least significant bits of the (B+$b_h$) most significant bits of v.

3. Reconciliation Function rec(w, b):

For q, $b_h$, B $\in$ Z, $b_h \geq 1$, B<$\log_2$ q−$b_h$, w $\in Z_q$, b $\in [0, 2^{b_h})$, rec(w,b)=$\lfloor v \rceil_{B,b_h}$ where v is the closest element to w such that $\langle v \rangle_{B,b_h}$=b. The closest element w may be taken according to the Lee distance, e.g., min(|v−w|,q−|v−w|).

These three functions can be applied element-wise to matrices. The above cited reconciliation function is used as an example, herein. As noted, the reconciliation methods in the above cited application could also be used. The cross-rounding function can be applied to obtain the reconciliation data and the rounding function to obtain the data which is reconciled, e.g., the reliable bits. When the reconciliation data is later used in the reconciliation function, the reconciled data is recovered. In other words: rec(w, ⟨v⟩)=⌊v⌉, assuming that v and w are within a threshold distance of each other.

A weak public key B is considered to be a security vulnerability, since a weak public key B, say having the value of zero, if not rejected by the second cryptographic key, may permit even a passive eavesdropper to read the session traffic.

As explained above, many lattice-based public-key encryption schemes such as considered, e.g., in the NIST PQC standardization project. Many lattice-based public-key encryption schemes do a key generation phase in which a public-key component is computed generally speaking as B=AS+E where A is a public parameter and S and E are secret. The first cryptographic device sends (A,B) to the second cryptographic device, or the like. Next, these schemes may require the second cryptographic device to encapsulate a message m, e.g., a key seed, as something like v=BR+E"+q/2 m. The second cryptographic device sends back to the first cryptographic device U=AR+E' and v, or the like.

Example, of lattice-based public-key encryption schemes like this include Round5 (e.g., page 17 of spec, Alg 1 and 2), FrodoKEM (page 17 of spec, Alg 9 and 10), NewHope (page 7, Alg 1 and 2), SABER (page 7, Alg 1 and 2), or Kyber (page 9 of spec, Alg 4 and 5).

If the second public key B has an unusual value, then this may not be secure. For example, if B then v leaks the encapsulated message m. This is so since BR+E" is small compared with q/2 m. The second public key may be small for any reasons, e.g., accidentally, e.g., programmer error, or as part of an attack, e.g., to make later repudiation possible.

Likewise, a special crafted public key U may leak information on the private key. This problem is most pronounced for a party that uses a long-term private key, e.g., the first cryptographic device. This problem can arise for example, for specially crafted keys U that are small or have many zero components. An example of an attack of this nature is given in the paper "An Efficient Key Mismatch Attack on the NIST Second Round Candidate Kyber", by Yue Qin, Chi Cheng, Member, IEEE, and Jintai Ding, Cryptology ePrint Archive: Report 2019/1343, the paper is included herein by reference.

Below several examples are given of validation procedures that can be applied to a public key. One or both of the first and second cryptographic devices may be configured with a validation procedure.

Upon reception of the public-key B (or U) the cryptographic device may check that values of the public key follow the corresponding probability distribution. This can be done by performing a statistical test such as chi square test, a binomial test, or a multinomial test, e.g., see "Open-Intro Statistics", Fourth Edition by David Diez, et al. For example, in the case of the non-ring parameter sets, these tests may be performed for each of the $\bar{n}$ and $\bar{m}$ components in B and/or U public-parameters.

The Chi-squared test may be used to verify if B and/or U are uniformly distributed. For example, a cryptographic device may be configured to: (i) compute a histogram of the public parameter, e.g., B or U, (ii) compute its Chi-squared statistic, and (iii) compare that to a fixed pre-computed critical value. The critical value may be determined by the degree of freedom, e.g., number of bins—1, and a P-value. The P-value may be chosen as smaller than a target failure probability of the Round5 parameter set. Preferably, for the Chi-squared test the number of expected elements per bin is at least 10. Furthermore, the test tends to be more accurate for a larger number of bins. In an embodiment, the number of bins may be set to $$2^{floor(\log_2 \frac{d}{10})}, \text{ or to } \left\lfloor \frac{d}{10} \right\rfloor,$$

or about.

In an embodiment, the test is performed twice: once on a histogram version derived from the public key, B and/or U, and once on a histogram derived from the public key after shifting the public-key components. For example, the public-key components may be shifted by k/2, where k is the bin size. This has the advantage of better detecting a non-uniform distribution of values close to the minimum and maximum values of consecutive bins.

A binomial test may be used to verify whether a certain value, e.g., the zero value, appears unexpectedly often. Given the expected probability of a value, or set of values, we can obtain a threshold value so that the tail of the binomial distribution, indicating how likely it is that the value or values occur more often than said threshold value, is smaller than the target failure probability of a Round5 parameter set.

In an embodiment, this check is performed throughout the whole range of possible values of the components of public key B and/or U. This is especially advantageous using balanced secrets, e.g., as in Round5. This test can be performed directly on B and U. The binomial test may also be performed on a histogram derived from the public key. This has the advantage of reducing memory needs. As for the chi-square test, the test may advantageously be performed on both the non-shifted and shifted histogram; that is the histogram obtained from the received public key and the histogram obtained after shifting the public-key components. For example, the public-key components may be shifted by k/2, where k is the bin size.

The Chi-squared and the binomial tests may involve two thresholds. To obtain the Chi-squared threshold, the critical value (CV), one may obtain the smallest CV for which the upper regularized incomplete gamma function is smaller than the target failure probability. In other words, one may compute the smallest value CV for which the integral of the upper part of the cumulative distribution function is smaller than the target failure probability.

$$1 - \frac{\Gamma(DF, 0, CV)}{\Gamma(DF)} < \text{failure probability}$$

where $\Gamma(\ )$ is the Gamma functiton and DF refers to the degrees of freedom. Similarly, the threshold for the binomial distribution may be determined as the smallest value c such that $\sum_{i=c}^{d} p(d,i) < $ failure probability where:

$$p(d, i) = \binom{d}{i}\left(\frac{k}{p}\right)^i \left(1 - \left(\frac{k}{p}\right)\right)^{d-i}$$

For instance, parameter set R5ND_1CPA_0d of Round5 may use the following two thresholds for the Chi-squared and binomial tests: 297 and 43. The first value considers a histogram version of the exchanged parameter sets using a bin size of 32. The second threshold value considers that the check is done for each of the p potential values of each component of B or U. The table below includes C code that includes function checkPublicParameter( ) that performs the Chi2 test and binomial test on the input public parameter according to the description above. In this table, PARAMS_D is the number of components of B and PARAMS_P refers to the size of each of the components. This tables gives an optimized implementation if the number of bins is a power of two.

```
// public_param is a pointer to the public parameter, offset is an offset for the computation of
the shifted histogram, nbins is the number of bits, and nbinsbits is the log2(nbins).
int chi2_simple_check(modp_t *public_param, uint16_t offset, uint8_t nbins, uint8_t nbinsbits){
    int ret = 0;
    uint16_t i, idx;
    uint16_t hist[MAXNBINS] = {0}; // reserve space for the histogram. Initialize to 0.
    // compute histogram. Note that offset is used to obtain the shifted histogram
    for (i=0; i< PARAMS_D; i++){
        idx = ((public_param[i] + offset) >> (PARAMS_P_BITS - nbinsbits)) & (nbins-1);
        hist[idx] += 1;
    }
    // chi2 test. Note that PARAMS_D does not need to be a multiple of NBINSBITS. Thus, PARAMS_D
>> nbinsbits is somewhat smaller than PARAMS_D/nbins. Can be corrected for more accurate
computation.
    uint64_t chi2 = 0;
    // compute chi2 value
    for (i=0 ; i < nbins ; i++){
        chi2 += (hist[i] - (PARAMS_D >> nbinsbits))*(hist[i] - (PARAMS_D >> nbinsbits));
    }
    chi2 /= PARAMS_D >> nbinsbits;
    // trigger alarm if the computed chi2 value is > than the critical value
    if (chi2 > CRITICALVALUE) {
        ret += -1;
    }
    return ret;
}
int chi2_check(modp_t *public_param, uint16_t offset, uint8_t nbins, uint8_t nbinsbits){
    int ret = 0;
    ) // chi2 test on normal histogram
    ret += chi2_simple_check(public_param, 0, nbins, nbinsbits);
    // chi2 test on shifted histogram
    ret += chi2_simple_check(public_param, PARAMS_P/(2*nbin s), nbins, nbinsbits);
}
    int bin_check(modp_t *public_param){
    int ret = 0;
    uint16_t i;
    uint16_t hist[PARAMS_P] = {0};   // Each element in the public parameter is between 0 and
PARAMS_P - 1.
    // count the number of values
    for (i=0; i< PARAMS_D; i++){
        hist[public_param[i]] += 1;
    }
    // binomial test
    for (i=0; i< PARAMS_P; i++){
        if (hist[i] > BINOMIAL_THRESHOLD) {
            ret += -1;
        }
    }
    return ret;
}
int checkPublicParameter(modp_t *public_param, uint16_t num vectors){
int ret = 0; //return 0 if test is ok. Return negative value if it is not ok.
    uint16_t j; //to loop over the components (num_vectors) of B and U in the non-ring case
    //determine maximum number of bins
    uint8_t nbins = 64;
    uint8_t nbinsbits = 6;
    if (PARAMS_D < 640){nbins = 32; nbinsbits = 5;}
    //chi2 test
    for (j=0; j < num_vectors; j++){
        ret += chi2_check(&public_param[j*PARAMS_D], 0, nbins, nbinsbits);
    }
    // binomial test 0,
    for (j=0; j < num_vectors; j++){
        ret += bin_check(&public_param[j*PARAMS_D], 0, nbin s, nbinsbits);
    }
    return ret;
}
```

For example, in Round5 and Saber and Frodo, the values of the public key are uniformly distributed in Z_p (Z_q in Frodo). A histogram may be computed having k bins, e.g., k>2. and count the distribution of the elements in B over p/k bins. For example, k may be chosen such that p/k is small, e.g., p/k=4. Larger values for p/k are also possible. In an embodiment, k is a power of 2. For example, since Round5 and Saber and Frodo have that p (and/or q) is a power of two, using a power of two for the k value too.

If one considers p/k bins, the probability that a value is less than k, equals k/p. The probability that exactly c out d values are less than k may be computed as $$p(d, c) = \binom{d}{c}\left(\frac{k}{p}\right)^c\left(1 - \left(\frac{k}{p}\right)\right)^{d-c}$$

The above formula holds for each k, without the requirement that k is a power of two. The probability that there are more than d-c_max different values less than v may be computed as the sum of p(d,d-c) with c from 0 to but excluding c_max. Thus, one may compute the maximum c for which the probability of a public key having so many small entries very small.

For instance, consider a public key having d values, e.g., a polynomial public key of degree d-1. For d=700, p=256, and k=256/4=64, the probability of finding a public-key B such that only up to 6 terms are greater than 64 is lower than 2^{−256}. With this, a validation procedure assuming above values is as follows:

k=p/4
Distribution[p/k]={0, 0, 0, 0}
For i=0 to d {Distribution [(B[i]>>log k)]++}
If Distribution[0]>d-6 {reject Public key}

The above algorithm may be executed upon reception of the public key B or U. The receiving device first sets a suitable value of k as described above. Then, it initializes an array called Distribution with p/k=4 bins to 0. Next, the receiving device loops over the coefficients of the received public-key, in the example above B. For each coefficient, it performs a bit shift to the right of log k bits, namely log p-2 bits so that only the two most significant bits remain and uses these two bits to increase the corresponding bin in the Distribution array. In the last line, if the first bin has a value higher than d-6, then the public-key B is rejected. The test could be changed or extended by rejecting on other elements in the Distribution array.

For example, this check may be applied to the cryptographic protocols described herein, to protocols such as Round5, SABER, Frodo, etc. Note that the above implementation assumes that k and p powers of two and classifies into p/k bins. This is not necessary though, for example, if p is not a power of two, one may check how many of the values are smaller than k. Note as well that it can be tested if a key has too many entries that are close to 0, but also close to p-1, or to both.

A particular case of special importance in all candidates is to check that B is not equal to zero. Another potentially weak B value is one that has all equal or nearly equal values; the latter is especially important for schemes using balanced ternary secrets such as Round5.

Schemes such as NewHope or Kyber perform the polynomial multiplication in a transformed domain, in this case the NTT domain, to speed up operations. Validating a public key is still possible though. For example, one may directly apply the techniques described herein by first transforming a public key back to the transformed domain to the normal domain. Some tests may be directly performed in the transformed domain however. For example, one may check whether a linear combination of products of coefficients in the transformed domain, which can be mathematically show to equal the Euclidean norm of the public key in the original domain has an unlikely value, in particular an unlikely small value.

For example, NewHope operates with strings of symbols from $\{0,1,\ldots,q-1\}$ with q=12289 of length n equal to 512 or 1024. The Number Theoretic Transform (NTT) of such a string g is defined as $G=(G_0, G_1, \ldots, G_{n-1})=NTT(g_0, g_1,\ldots,g_{n-1})=NTT(g)$ with $G_j=\Sigma_{i=0}^{n-1} g_i \gamma^i \omega^{ij} (\mod q)$. Here, $\omega$ is a primitive n-th root of unity in Z_q, and $\gamma^2=\omega$.

According to Table 2 in the NewHope specification, $\gamma=10968$ if n=512 and $\gamma=7$ if n=1024. The NTT is invertible; if G=NTT(g), then $g_i=n^{-1}\gamma^{-i}\Sigma_{j=0}^{n-1} G_j \omega^{-ij}$. Here, $n^{-1}$ is the integer in Z_q satisfying $n \cdot n^{-1} \equiv 1 \mod q$. If f, g are sequences of length n, and $e_i=f_i g_i \gamma^i$ for $0 \leq i \leq n-1$, then it can be mathematically shown that $$E_0 = n^{-1}\Sigma_{j=0}^{n-1} F_j G_{n-j} \quad (*)$$

In particular, if $f_i=g_i\omega^{-i}$, then $E_0=\Sigma_{i=0}^{n-1}(f_i g_i \gamma^i)\gamma^i = \Sigma_{i=0}^{n-1} g_i^2 = n^{-1}\Sigma_{j=0}^{n-1} F_j G_{n-j}$. By direct computation, $F_j=\Sigma_{i=0}^{n-1}\gamma^i g_i \omega^{-i} w^{ij}=G_{j-1}$, so that the following holds:

$$\Sigma_{i=0}^{n-1} g_i^2 = n^{-1}\Sigma_{j=0}^{n-1} G_j G_{n-1-j} \quad (**)$$

Thus, assuming that we have a threshold denoted as "Norm_threshold" a check applicable to a public key in a transformed domain, e.g., NewHope is as follows:

Norm=0
For j=0 to n {Norm+=B[i]*B[n−1−i]}
Norm=Norm*n^{−1} mod q.
If Norm<Norm_threshold {reject Public-key}

In the first line, it initialize the Norm to 0. In the second line, it goes through the coefficients of the received public-key and computes $\Sigma_{j=0}^{n-1} G_j G_{n-1-j}$ in (**). In the third line, it multiplies by $n^{-1}$ and reduces module q to obtain the norm. If the norm is smaller than the threshold, the public-key is rejected.

This works because it successfully detects very small keys B and U. It may happen that some large keys B and U are misclassified since the norms are computed modulo q.

Accordingly, instead of outright rejection, one could instead used the above algorithm as an indicator that requires performing a more expensive operation, namely, performing a transformation back to the normal domain and perform then any of the other checks listed herein.

An additional check is to look whether a linear combination of coefficients, corresponding to the sum of the entries in the original domain, is below a threshold. In fact, taking $f_i=\omega^{-i}$ in (*), we find that $\Sigma_{i=0}^{n-1} g_i = n^{-1} \Sigma_{j=0}^{n-1} F_j G_{n-j}$. By direct computation, $$F_j = \Sigma_{i=0}^{n-1} \gamma^i f_i \omega^{ij} = \Sigma_{i=0}^{n-1} \gamma^{(2j-1)i} = \frac{\gamma^{(2j-1)n}-1}{\gamma^{(2j-1)}-1} = \frac{2}{1-\gamma^{2j-1}}.$$

Here we used that $\omega^n=1$ and $\gamma^2=\omega$, so that $\gamma^n=-1$. The test on the public key B in the NTT domain thus is if $$n^{-1}\Sigma_{j=0}^{n-1} \frac{2}{1-\gamma^{2j-1}} B_{n-j}$$

modulo q is below a threshold, or in a set of the form $[0, t_1] \cup [q-t_2, q-1]$.

Attacks on long-term private keys, using public key with special properties, may require multiple calls to the decapsulation algorithm before a useful amount of information is obtained by an attacker. An attacker may circumvent the validation procedure by tuning his public keys so that a no alarm is triggered by the validation procedure (e.g., the public-key u that is used to attack has 7 non-zero elements instead of only 6) at the expense of requiring more calls. This may be addressed by including state full validation procedure, e.g., by keeping a state of previous exchanges. The alarm may be triggered if more than x messages are received that deviate from the norm. For example, if a first threshold is passed a public key may be rejected or an alarm may be generated outright, but if a second, less strict, threshold is passed, a count may be increased for the private key, or for the cryptographic device that sent the public key, or for a combination. If the count exceeds a threshold, the public keys are rejected, or the less-strict test may be used instead of the stricter test.

For instance, the strict threshold may be 6 non-zero coefficients (or fewer) and a less-strict threshold may be 7 non-zero coefficients. When a public key has 6 non-zero coefficients or fewer it is rejected. If the public key 7 non-zero coefficients a count is increased. If the count exceeds a threshold, which may be only 2, the public key is still rejected. For example, if two public keys are received with 7 non-zero coefficients the latter is rejected, moreover, from that point on 7 non-zero coefficients may be sufficient to reject a public key.

Figure 5:
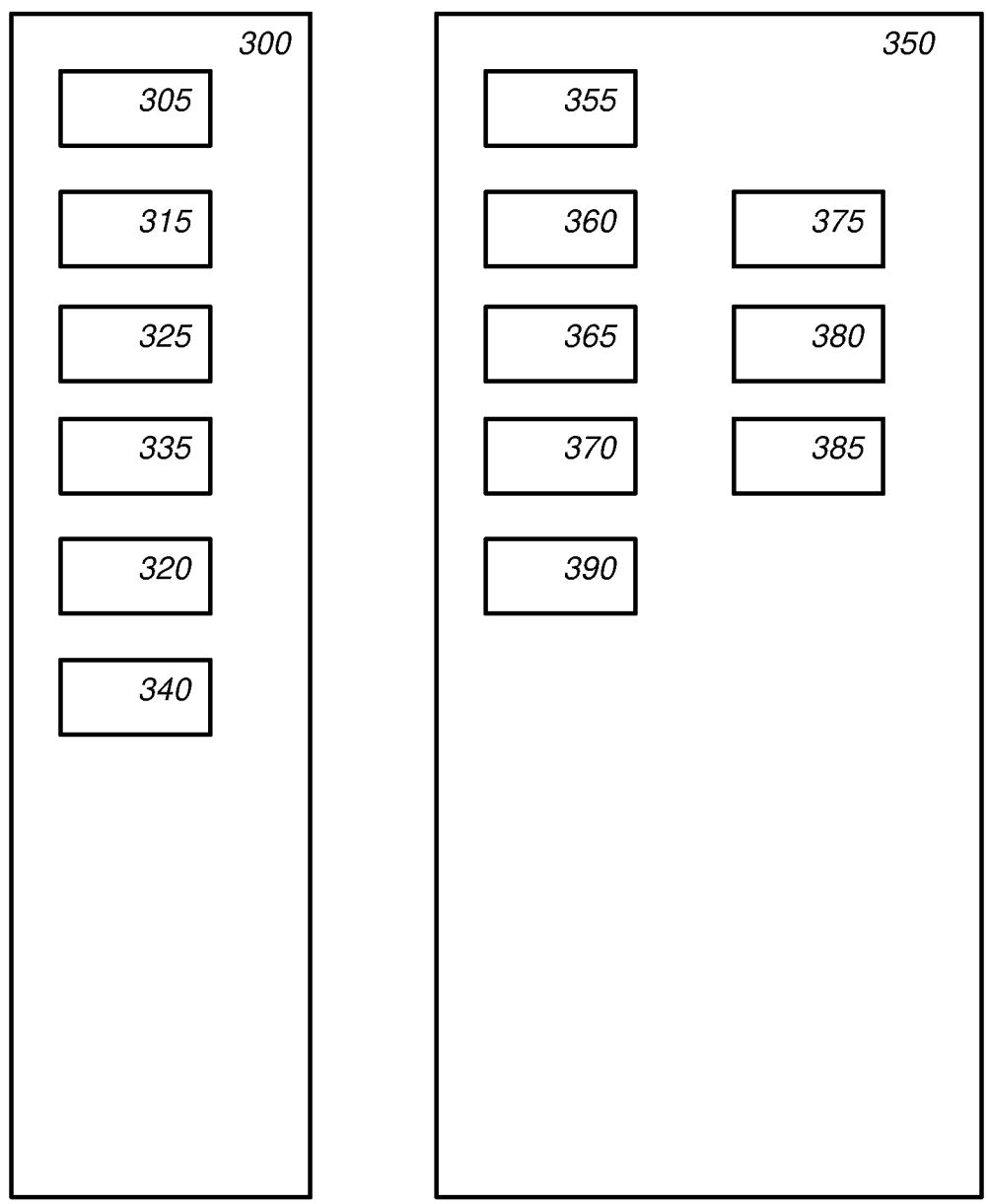

FIG. 5 schematically shows an example of a cryptographic system 301 according to an embodiment. System 301 comprises a first cryptographic device 300, a second cryptographic device 350 and optionally a public key depository 302. For example, the first device 300 and second device 350 may be implemented on a device such as first device 10, 100 and/or second device 20, 200. Cryptographic system 301 may implement a public-key encryption system as illustrated in FIG. 4. Cryptographic system 301 may be adapted to other embodiments as desired, e.g., by omitting elements that are unused in said embodiments.

First and second device 300 and 350 are configured to perform a cryptographic protocol. They have the ability to securely pass data from one device to the other. Various cryptographic protocols may use this same ability. As an example, two protocols are described that use this ability.

For example, the first and second device may be configured public key encryption, e.g., designed to allow other devices, say second device 350, to encrypt a message (m) such that a particular device, say first device 300 can decrypt them. However, the contents of the public-key encrypted message cannot be obtained by other devices than the encrypting and decrypting device, e.g., second device 350 and first device 300. In case of public key encryption, the same public key of the first device, e.g., the same first public key and public object, may be used by multiple second devices to send encrypted messages to the first public device. Even if two second devices use the same public key to encrypt a message, they cannot decrypt the other's communication.

The first device 300 and second device 350 comprise a communication interface 305 and 355 respectively. The communication interfaces are configured to communicate with each other. Examples, of communication interfaces, e.g., over wired or wireless networks, are described herein.

First device 300 comprises a public/private key generator 315 configured to generate a first private key (r) and a first public key (b) derived from the first private key. Deriving the public key from the private key may use a public object (a), e.g., a public matrix or public polynomial. For example, generating the public key may involve multiplication with the public object, and/or introducing some type of noise, e.g., scaling down the multiplication result, adding a noise term, etc. The private key and public object may be a matrix, e.g., over a finite field or ring.

The first private and public key may be generated ephemerally. For example, the latter may be done for a key agreement protocol, especially, if the first and second device use some other authentication mechanism, e.g., an out-of-band mechanism, e.g., certificate based authentication or the like, to authenticate each other. The first private and public key may also be generated for longer term use. For example, the first public key may be stored in an external public key depository 302. Public key depository 302 may also store the public object (a) or seed therefor. Public key depository 302 may be configured to perform a public key validation procedure on a received public key. For example, Public key depository 302 may reject a key that does not pass a validation procedure. For example, a public key which is too small, e.g., has too many small elements, may be rejected. Small elements may be determined as smaller in absolute value than a bound.

The first public key is transferred from the first device 300 to the second device 350, e.g., through communication interfaces 305 and 355. This may be done by direct communication, or indirect, e.g., through public key depository 302. Together with the first public key, also the public object (a), may also be transferred, if needed. For example, the public object may be transferred by sending a seed from which the public object (a) may be generated.

Second device 350 may comprise a public key obtainer 360, e.g., configured to retrieve the first public key from public key depository 302. For example, this type of obtaining is suitable for public key encryption. However, the public key may also be obtained directly from the first device, possibly out-of-bound, e.g., in an email. The public key may be stored until needed for a public key encryption exchange. However, the first public key may also be received for immediate use, e.g., for a key sharing operation, e.g., in this case the first public key and/or public object, may be ephemerally generated. The public key obtainer 360 may be configured to perform a public key validation procedure.

Second device 350 may comprise a public/private key generator 365 configured to generate a second private key (s) and to generate a second public key (u) from the second private key (s). The second private key (s) and second public key (u) may be smaller, e.g., have fewer entries, than the first private key (r) and first public key (b).

The second public key uses the same public object as generating the first public key did. The first and second private keys are private to their respective devices. They may be shared with trusted parties if needed, e.g., for back-up, key escrow, etc. The public keys, and the public object are not necessarily secret for security; nevertheless one or more of them may still be private to first and second device if desired. For example, the first public key may only be shared with the second device, and vice versa.

Second device 350 may comprise a code word generator 370. Code word generator 370 is configured to generate a code word according to an error correcting code. The error correcting code may be a linear code or a non-linear code.

For example, the error correcting code may be a BCH code, a Reed-Solomon code, Hadamard code, and the like. Multiple codes may be concatenated. Concatenated codes are error-correcting codes that are constructed from two or more simpler codes in order to achieve good performance with reasonable complexity. For example, a Hadamard code may be concatenated with a BCH code.

Encoded in the code word is the data for encapsulation. For example, code word may be partitioned into a data part, e.g., data bits and a parity part, e.g., parity bits. For example, the data for encapsulation may be comprised in the data bits. One way to generate a code word is to generate a data part and compute parity bits from the data part. For example, a data vector with data bits may be matrix multiplied by a parity matrix to obtain the parity bits, or even the full code word. The code word may be obtained by combining the data for encapsulation and the parity bits. For example, the data part and the parity part may be concatenated, although any permutation of data bits and parity bits may be used to produce a valid code word according to a corresponding error correcting code. For example, data bits and parity bits may be alternated. Note that reconciliation data is typically computed on single q-ary symbols, but parity data is typically computed from multiple bits; note that q is much larger than 2.

The code word may be used in various ways. Public key encryption may also be obtained by encrypting the message (m) at the second device 350, e.g., by a symmetric key, e.g., randomly generated for this purpose, and encoding the encrypting symmetric key in the code word. An additional key derivation step may be used. For example, a random pre-key may be encoded in the code word, and the encrypting key may be derived from the pre-key. For example, deriving may use a key derivation function (KDF), e.g., a hash function. For example, in the latter case, the encrypted message may be sent from the second device to the first device together with the required data for decrypting the data, e.g., the second public key, and other data, as described below. A key seed may be directly encoded in the code word, or may be derived therefrom.

Interestingly, the code word is generated independent from first private key, first public key, second private key and second public key. Because of this, the protocol has increased resistance against active attacks. An attacker has fewer possibilities to influence the shared key since it cannot influence the key through the choice of the first and second private keys. In an embodiment, the second private key matrix is derived from the code word, or from the key seed.

Independent generation may be obtained, e.g., in case of a message, if the message is generated from an application that is independent from the public key encryption, e.g., a financial or communication application, etc. Independent generation may be obtained, e.g., by random generation. For example, the key or pre-key in the code word may be generated independently, e.g., using a true random number generator, or using a pseudo random generator using a seed that is independent from the first and second private key, e.g., which is itself randomly generated, or pre-determined or the like. For example, the code word may be generated at the second device even before the first public key is received and/or before the second private key is generated; this also ensures independence.

Second device 350 comprises a Diffie-Hellman unit 375. Diffie-Hellman unit 375 is configured to generate a second raw shared key (k*) from the first public key (b) and the second private key (s). For example, the Diffie-Hellman unit 375 may be configured to apply a Diffie-Hellman function to the first public key and the second private key. For example, the Diffie-Hellman function may be multiplication. Second device 350 is configured to transfer its second public key to the first device 300. First device 300 comprises a Diffie-Hellman unit 325. Diffie-Hellman unit 325 is configured to generate a first raw shared key (k') from the second public key (u) and the first private key (r), e.g., by applying the same Diffie-Hellman function. Unfortunately, for some types of Diffie-Hellman functions it may happen that the first and second raw keys are close to each other, though not necessarily identical. The particular likelihood of this happening depends on the underlying Diffie-Hellman function. Some likelihood of different raw keys may be accepted in most applications, however, how high this likelihood may be will depend on the application. Typically though, a lower likelihood will be preferred. The raw key may be of the same mathematical type, e.g., matrix, as the private and public keys.

Second device 350 comprises a reliable bit generator 380 and a reconciliation data generator 385. Reliable bit generator 380 is configured to apply a reliable bit function to the second raw shared key (k*) to obtain reliable indices and reliable bits derived from the indicated coefficients. The reliable indices indicate the coefficients of the raw shared key. For example, the reliable bit generator 380 may determine which coefficients in the raw key are close to a sampling border and which are not. For example, the coefficients in the raw key which are within a threshold of a sampling border may be discarded as unreliable. The remaining, reliable, coefficient may be indicated by the reliable indices. The reliable bits may be obtained by sampling the reliable coefficients.

In case not enough coefficients remain, there are several possibilities, e.g., terminating the protocol, restarting the protocol with a new first and/or second private key, and/or new public object, deriving a shorter key, or discarding fewer coefficients. Instead of selecting all coefficients within a threshold, one may also select a pre-determined number of coefficients, e.g., mu coefficients, and select the most reliable coefficients, e.g., the first mu most reliable coefficients.

One way to implement reliable bits is take one or more, say B, most significant bits of a coefficients. For example, the number of reliable bits per selected coefficients may be, say, 1, or 2. In some embodiments, e.g., when large matrices are used the number of coefficients is large, which allows a high reliability, e.g., a low value for B. For other embodiments, e.g., for IoT devices larger values for B may be used. The computations in a finite ring may be done in the finite ring of the integers modulo a power of 2. The latter choice has the advantage of a more even distribution in the reliable bits.

Reconciliation data generator 385 is configured to generate reconciliation data (h) for the indicated coefficients of the raw shared key. The reconciliation data comprising information allowing reducing of differences between the first and second raw key derived at the first and second device. For example, applying reconciliation data may cause the difference, e.g., the Lee distance, between a coefficient of the raw keys at the first and second device to be reduced, thus increasing the probability that both will produce the same reliable bit. Both the parity bits in the code word and the reconciliation data server to reduce noise, however, the parity bits are computed over multiple data bits, whereas the reconciliation data is computed over coefficients in a raw shared key. The reconciliation data further increase the reliability of the reliable bits.

One way to implement reconciliation data is take one or more, say $b_h$, bits of a coefficients that follow the bits taken as reliable bits. For example, these may be the $b_h$ bits that follow the B bits in significance. For example, the number of reconciliation bits per selected coefficients may be, say, 1, or 2. A smaller number of reconciliation bits has the advantage of reducing communication overhead. A larger amount of reconciliation bits is possible though.

Second device 350 may comprise an encapsulation unit 390. Encapsulation unit 390 is configured to encapsulate the code word with the reliable bits by applying an encapsulation function, e.g., an XOR. The encapsulation may be one-time pad encapsulation. In an embodiment, the encapsulation function obtains perfect security, in the sense that the information on the code word that can be obtained from the encapsulated the code word is zero without knowing reliable bits. For example, an XOR function may be used, on one of the other encapsulation functions described herein.

Note that the encapsulation applies to the whole code word, including data bits and parity bits, and not just to parity bits. Furthermore, encapsulation is applied to generated data e.g., a message, a key, a pre-key, etc. not to data derived from one or more of the first or second public or private keys.

The second device is configured to transfer the second public key (u), the reconciliation data (h), the encapsulated data (c), and the reliable indices to the first device. The transferring may be in response to receiving the first public key, e.g., in case of key agreement, or not, e.g., in case of public key encryption.

The first device 300 is configured to receive from the second device a second public key (u), reconciliation data (h), and encapsulated data (c), and reliable indices. First device 300 may be configured to perform a public key validation procedure on public key (u). First device 300 comprises a reconciliation unit 335 configured to apply the reconciliation data (h) in a reconciliation function to the coefficients in the first raw shared key (k') indicated by the reliable indices (safe bits), obtaining reliable bits (k). For example, a coefficient indicated as reliable may be reconciled using the reconciliation bits and then sampled to obtain a reliable bit.

First device 300 comprises a decapsulation unit 340 configured to decapsulate the encapsulated data (c) obtaining a near-code word using the reliable bits. The reason the code word of the second device may not be obtained directly is that even with reliable bits and reconciliation there may still be differences between the raw keys that are not resolved. First device 300 comprises an error corrector 320 that is configured to apply an error correction function to the near-code word obtaining a code word.

Finally, the code word may be decoded, e.g., to obtain the data part and thus obtain the message (m), the key (K) or pre-key, e.g., key seed. In the first case some action may be taken based on the message, e.g., the message may be displayed, e.g., in a communicator app. In the second case, the key may be used for further protected communications, etc. In the third case, a key derivation function may be applied to the pre-key to obtain a shared key.

In some embodiments, the processor of the second cryptographic device is configured to derive a final key based on at least the key seed, encrypt a message with the final key, and to transfer said encrypted message to the first cryptographic device. In some embodiments, the processor of the first cryptographic device is configured to receive an encrypted message from the first cryptographic device, to derive the final key based on at least the key seed, and to decrypt the encrypted message with the final key.

For example, in an embodiment, the second cryptographic device and/or the private key decryption device may derive the final key at least based in part on applying a cryptographic hash function to the key seed. As an illustrative example, the final key may be derived from the key seed K by applying a cryptographic hash function to the key seed and optionally part or whole of the public key, e.g., G=H(m||pk). Such a cryptographic hash G may be used directly as final key, or, optionally, at least part of such a cryptographic hash, e.g., L||rest=G, may be further hashed, e.g., with the masked key seed c, to obtain the final key, e.g., k=H(L||c).

Figure 6A:
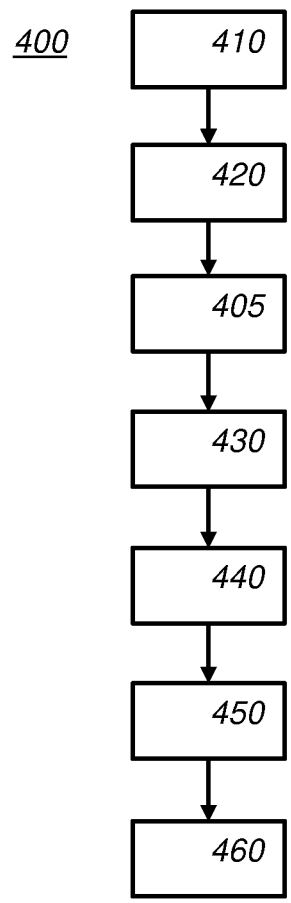

FIG. 6a schematically shows an example of a second cryptographic method (400) according to an embodiment. Method 400 comprises establishing (410) communication with a first cryptographic device, obtaining (420) a first public key (b) associated with the first cryptographic device, generating (430) a second private-key (r), and compute a second public-key (u) from the second private-key (r), computing (440) a second raw shared key (k*) from the second private key (r) and the first public key (b), computing the second raw shared key comprising a noisy multiplication between the second private key (r) and the first public key (b), encapsulating (450) a key seed (m) with at least part of the second raw shared key by applying an encapsulation function, obtaining encapsulated data (v), and transferring (460) the second public-key (u), and the encapsulated data (v) to the first cryptographic device, and applying (405) a validation procedure to the obtained public key (b) to determine if the public key is secure for encapsulation of a key seed, wherein the key seed is not encapsulated or the encapsulated data (v) is not transferred if the validation procedure was unsuccessful.

Validation procedure 405 may be performed between obtaining 420 and encapsulating 450. Validation procedure 405 may be performed after encapsulating 450, in which case the encapsulation may be discarded, e.g., before transferring 460.

Figure 6B:
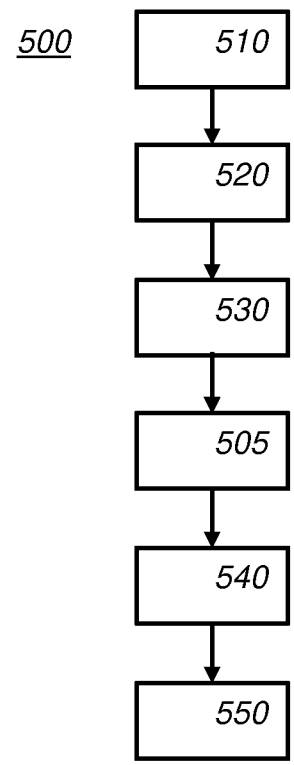
Figure 7A:
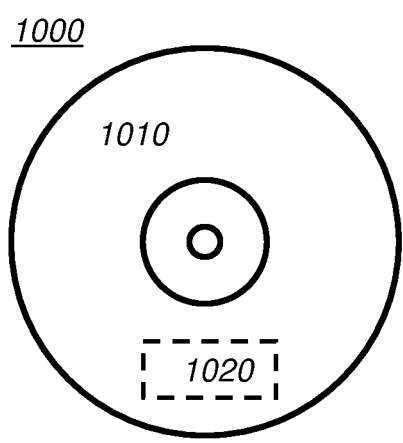
Figure 7B:
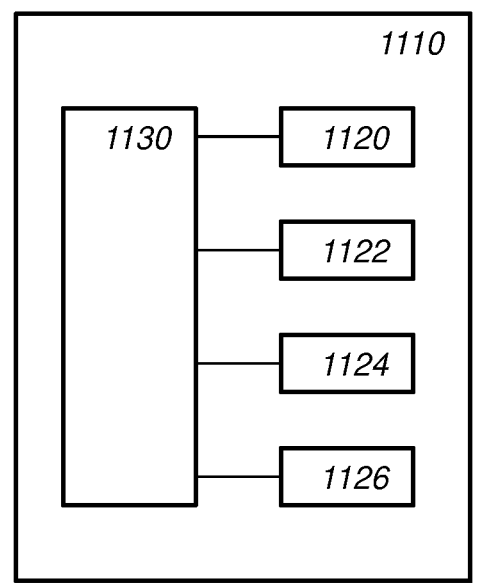

FIG. 6b schematically shows an example of a first cryptographic method 500 according to an embodiment. Method 500 comprises establishing (510) communication with a second cryptographic device generating (520) a first private-key (s) and compute a first public-key (b) from the first private-key (s), and allow transfer of the first public-key (b) to the second cryptographic device, receiving (530) from the second cryptographic device a second public-key (u) and encapsulated data (v), computing (540) a first raw shared key (k') from the second public-key (u) and the first private-key (s), computing the first raw shared key comprising a noisy multiplication between the second public-key (u) and the first private-key (s), decapsulating (550) the encapsulated data (v) using at least part of the first raw shared key (k') to obtain a key seed, and applying (505) a validation procedure to the obtained public key to determine if the public key is secure for decapsulation of a key seed, wherein the key seed is not decapsulated or the decapsulated data (v) is not used if the validation procedure was unsuccessful.

Many different ways of executing the method are possible, as will be apparent to a person skilled in the art. For example, the steps can be performed in the shown order, but the order of the steps may also be varied or some steps may be executed in parallel. Moreover, in between steps other method steps may be inserted. The inserted steps may represent refinements of the method such as described herein, or may be unrelated to the method. Moreover, a given step may not have finished completely before a next step is started.

Embodiments of the method may be executed using software, which comprises instructions for causing a processor system to perform method 400 and/or 500. Software may only include those steps taken by a particular sub-entity of the system. The software may be stored in a suitable storage medium, such as a hard disk, a floppy, a memory, an optical disc, etc. The software may be sent as a signal along a wire, or wireless, or using a data network, e.g., the Internet. The software may be made available for download and/or for remote usage on a server. Embodiments of the method may be executed using a bitstream arranged to configure programmable logic, e.g., a field-programmable gate array (FPGA), to perform the method.

It will be appreciated that the invention also extends to computer programs, particularly computer programs on or in a carrier, adapted for putting the invention into practice. The program may be in the form of source code, object code, a code intermediate source, and object code such as partially compiled form, or in any other form suitable for use in the implementation of an embodiment of the method. An embodiment relating to a computer program product comprises computer executable instructions corresponding to each of the processing steps of at least one of the methods set forth. These instructions may be subdivided into subroutines and/or be stored in one or more files that may be linked statically or dynamically. Another embodiment relating to a computer program product comprises computer executable instructions corresponding to each of the means of at least one of the systems and/or products set forth.

It should be noted that the above-mentioned embodiments illustrate rather than limit the invention, and that those skilled in the art will be able to design many alternative embodiments.

In the claims, any reference signs placed between parentheses shall not be construed as limiting the claim. Use of the verb 'comprise' and its conjugations does not exclude the presence of elements or steps other than those stated in a claim. The article 'a' or 'an' preceding an element does not exclude the presence of a plurality of such elements. Expressions such as "at least one of" when preceding a list of elements represent a selection of all or of any subset of elements from the list. For example, the expression, "at least one of A, B, and C" should be understood as including only A, only B, only C, both A and B, both A and C, both B and C, or all of A, B, and C. The invention may be implemented by means of hardware comprising several distinct elements, and by means of a suitably programmed computer. In the device claim enumerating several means, several of these means may be embodied by one and the same item of hardware. The mere fact that certain measures are recited in mutually different dependent claims does not indicate that a combination of these measures cannot be used to advantage.

In the claims references in parentheses refer to reference signs in drawings of exemplifying embodiments or to formulas of embodiments, thus increasing the intelligibility of the claim. These references shall not be construed as limiting the claim.

The invention claimed is:

1. A second cryptographic device comprising:
   a communication interface circuit, wherein the communication interface circuit is arranged to communicate with a first cryptographic device; and
   a processor circuit,
      wherein the processor circuit is arranged to obtain a first public key,
      wherein the first public key is associated with the first cryptographic device,
      wherein the processor circuit is arranged to generate a second private-key,
      wherein the processor circuit is arranged to compute a second public-key from the second private-key,
      wherein the processor circuit is arranged to compute a second raw shared key from the second private key and the first public key,
      wherein computing the second raw shared key comprises a noisy multiplication between the second private key and the first public key,
      wherein the processor circuit is arranged to encapsulate a key seed with at least part of the second raw shared key by applying an encapsulation function so as to obtain encapsulated data,
      wherein the processor circuit is arranged to transfer the second public-key, and the encapsulated data to the first cryptographic device,
      wherein the processor circuit is arranged to apply a validation procedure to the obtained public key to determine if the public key is secure for encapsulation of a key seed,
      wherein the key seed is not encapsulated or the encapsulated data is not transferred if the validation procedure determines that the public key is insecure.

2. The second cryptographic device according to claim 1, wherein the first public key, first private key, second public key and second private key are matrices over a finite field or ring, or the first public key, first private key, second public key and second private key are polynomials over a finite field or ring.

3. The second cryptographic device according to claim 1, wherein the validation procedure comprises determining if the magnitude of the obtained public key is below a threshold.

4. The second cryptographic device according to claim 1, wherein the validation procedure comprises determining if a number of values below a first threshold in the obtained public key is smaller than a second threshold.

5. The second cryptographic device according to claim 1, wherein the validation procedure comprises:
   computing a histogram of values in the obtained public key; and
   comparing the computed histogram to an expected histogram.

6. The second cryptographic device according to claim 5, wherein the validation procedure comprises:
   determining if a bin of the computed histogram is smaller than a threshold; and/or
   determining if a bin of the computed histogram is larger than a threshold; and/or
   computing a distance between the computed histogram and an expected histogram so as to determine if the distance is above a threshold.

7. The second cryptographic device according to claim 1, wherein the validation procedure comprises:
computing a histogram of values in the obtained public key;
applying a statistical test to the computed histogram;
shifting the obtained public key;
computing a further histogram of values in the shifted public key; and
applying a statistical test to the computed further histogram.

8. The second cryptographic device according to claim 1, wherein the validation procedure comprises determining if the obtained public key is all zero or near-all zero.

9. The second cryptographic device according to claim 1, wherein the validation procedure comprises determining if the number of values of the public key equal to each other exceeds a threshold.

10. The second cryptographic device according to claim 1,
wherein the public key is obtained in a transformed domain,
wherein the validation procedure comprises determining if a norm of the public key in the transformed domain is less than a threshold.

11. The second cryptographic device according to claim 1, wherein the noisy multiplication comprises a multiplication and scaling the resulting elements down.

12. The second cryptographic device according to claim 1,
wherein the processor circuit is arranged to derive a symmetric encryption key from the key seed,
wherein the processor circuit is arranged to encrypt a message with the derived key,
wherein the processor circuit is arranged to transfer the encrypted message to the first cryptographic device.

13. A first cryptographic device comprising
a communication interface circuit, wherein the communication interface circuit is arranged to communicate with a second cryptographic device; and
a processor circuit,
wherein the processor circuit is arranged to generate a first private-key,
wherein the processor circuit is arranged to compute a first public-key from the first private-key,
wherein the processor circuit is arranged to allow transfer of the first public-key to the second cryptographic device,
wherein the processor circuit is arranged to receive a second public-key and encapsulated data from the second cryptographic device,
wherein the processor circuit is arranged to compute a first raw shared key from the second public-key and the first private-key,
wherein computing the first raw shared key comprises a noisy multiplication between the second public-key and the first private-key,
wherein the processor circuit is arranged to decapsulate the encapsulated data using at least part of the first raw shared key so as to obtain a key seed,
wherein the processor circuit is arranged to apply a validation procedure to the obtained public key so as to determine if the public key is secure for decapsulation of a key seed,
wherein the key seed is not decapsulated or the decapsulated data is not used if the validation procedure determines that the public key is insecure.

14. The first cryptographic device according to claim 13, wherein the first public key, first private key, second public key and second private key are matrices over a finite field or ring, or the first public key, first private key, second public key and second private key are polynomials over a finite field or ring.

15. The first cryptographic device according to claim 13, wherein the validation procedure comprises determining if the magnitude of the obtained public key is below a threshold.

16. The first cryptographic device according to claim 13, wherein the validation procedure comprises determining if a number of values below a first threshold in the obtained public key is smaller than a second threshold.

17. The first cryptographic device according to claim 13, wherein the validation procedure comprises:
computing a histogram of values in the obtained public key; and
comparing the computed histogram to an expected histogram.

18. The first cryptographic device according to claim 17, wherein the validation procedure comprises:
determining if a bin of the computed histogram is smaller than a threshold; and/or
determining if a bin of the computed histogram is larger than a threshold; and/or
computing a distance between the computed histogram and an expected histogram so as to determine if the distance is above a threshold.

19. The first cryptographic device according to claim 2, wherein the validation procedure comprises:
computing a histogram of values in the obtained public key;
applying a statistical test to the computed histogram;
shifting the obtained public key;
computing a further histogram of values in the shifted public key; and
applying a statistical test to the computed further histogram.

20. The first cryptographic device according to claim 13, wherein the validation procedure comprises determining if the obtained public key is all zero or near-all zero.

21. The first cryptographic device according to claim 13, wherein the validation procedure comprises determining if the number of values of the public key equal to each other exceeds a threshold.

22. The first cryptographic device according to claim 2,
wherein the public key is obtained in a transformed domain,
wherein the validation procedure comprises determining if a norm of the public key in the transformed domain is less than a threshold.

23. The first cryptographic device according to claim 13, wherein the noisy multiplication comprises a multiplication and scaling the resulting elements down.

24. The first cryptographic device according to claim 13,
wherein the processor circuit is arranged to derive a symmetric encryption key from the key seed,
wherein the processor circuit is arranged to receive an encrypted message from the second cryptographic device,
wherein the processor circuit is arranged to decrypt the encrypted message.

25. A cryptographic method comprising:
establishing communication with a first cryptographic device;
obtaining a first public key, wherein the first public key is associated with the first cryptographic device;

generating a second private-key;
computing a second public-key from the second private-key;
computing a second raw shared key from the second private key and the first public key;
computing the second raw shared key, wherein the shared key comprises a noisy multiplication between the second private key and the first public key;
encapsulating a key seed with at least part of the second raw shared key by applying an encapsulation function so as to obtain encapsulated data;
transferring the second public-key, and the encapsulated data to the first cryptographic device; and
applying a validation procedure to the obtained public key to determine if the public key is secure for encapsulation of a key seed, wherein the key seed is not encapsulated or the encapsulated data is not transferred if the validation procedure was unsuccessful.

26. A cryptographic method comprising:
establishing communication with a second cryptographic device;
generating a first private-key;
computing a first public-key from the first private-key;
transferring the first public-key to the second cryptographic device;
receiving a second public-key and encapsulated data from the second cryptographic device;
computing a first raw shared key from the second public-key and the first private-key;
computing the first raw shared key, wherein the first raw key comprises a noisy multiplication between the second public-key and the first private-key;
decapsulating the encapsulated data using at least part of the first raw shared key so as to obtain a key seed; and
applying a validation procedure to the obtained public key to determine if the public key is secure for decapsulation of a key seed, wherein the key seed is not decapsulated or the decapsulated data is not used if the validation procedure was unsuccessful.

27. A computer program stored on a non-transitory medium, wherein the computer program when executed:
establishes communication with a first cryptographic device;
obtains a first public key, wherein the first public key is associated with the first cryptographic device;
generates a second private-key;
computes a second public-key from the second private-key;
computes a second raw shared key from the second private key and the first public key;
computes the second raw shared key, wherein the shared key comprises a noisy multiplication between the second private key and the first public key;
encapsulates a key seed with at least part of the second raw shared key by applying an encapsulation function so as to obtain encapsulated data;
transfers the second public-key, and the encapsulated data to the first cryptographic device; and
applies a validation procedure to the obtained public key to determine if the public key is secure for encapsulation of a key seed, wherein the key seed is not encapsulated or the encapsulated data is not transferred if the validation procedure was unsuccessful.

28. A computer program stored on a non-transitory medium, wherein the computer program when executed:
establishes communication with a second cryptographic device;
generates a first private-key;
computes a first public-key from the first private-key;
transfers the first public-key to the second cryptographic device;
receives a second public-key and encapsulated data from the second cryptographic device;
computes a first raw shared key from the second public-key and the first private-key;
computes the first raw shared key, wherein the first raw key comprises a noisy multiplication between the second public-key and the first private-key;
decapsulates the encapsulated data using at least part of the first raw shared key so as to obtain a key seed; and
applyies a validation procedure to the obtained public key to determine if the public key is secure for decapsulation of a key seed, wherein the key seed is not decapsulated or the decapsulated data is not used if the validation procedure was unsuccessful.

* * * * *